(12) United States Patent
Chen et al.

(10) Patent No.: US 11,002,903 B2
(45) Date of Patent: May 11, 2021

(54) ELECTRONIC DEVICE

(71) Applicant: InnoLux Corporation, Miao-Li County (TW)

(72) Inventors: Chun-Fang Chen, Miao-Li County (TW); Hui-Wen Su, Miao-Li County (TW); Wei-Tsung Hsu, Miao-Li County (TW); Shih-Ching Hsu, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 16/884,308

(22) Filed: May 27, 2020

(65) Prior Publication Data
US 2020/0400872 A1 Dec. 24, 2020

(30) Foreign Application Priority Data

Jun. 18, 2019 (CN) .......................... 201910524835.X
Feb. 4, 2020 (CN) .......................... 202010079716.0

(51) Int. Cl.
*F21V 8/00* (2006.01)

(52) U.S. Cl.
CPC ........... *G02B 6/0083* (2013.01); *G02B 6/009* (2013.01); *G02B 6/0031* (2013.01); *G02B 6/0053* (2013.01)

(58) Field of Classification Search
CPC .. G02B 6/0083; G02B 6/0031; G02B 6/0053; G02B 6/009
USPC ....................................................... 362/606
See application file for complete search history.

(56) References Cited

U.S. PATENT DOCUMENTS

| | | | |
|---|---|---|---|
| 5,359,691 A * | 10/1994 | Tai ....................... | G02B 6/0016 362/561 |
| 8,368,842 B2 | 2/2013 | Oki et al. | |
| 8,629,475 B2 * | 1/2014 | Tischler ............... | H01L 33/486 257/98 |
| 2001/0012159 A1 * | 8/2001 | Umemoto ........... | G02B 6/0056 359/599 |
| 2009/0091919 A1 * | 4/2009 | Goto ................. | G02F 1/133603 362/97.1 |
| 2009/0185362 A1 * | 7/2009 | Hong .................... | H05K 1/183 362/97.1 |
| 2010/0110334 A1 * | 5/2010 | Oki ................... | G02F 1/133615 349/62 |
| 2010/0128194 A1 * | 5/2010 | Cho .................... | G02B 6/0083 349/58 |
| 2010/0265694 A1 * | 10/2010 | Kim .................... | G02B 6/0068 362/97.1 |
| 2010/0290248 A1 * | 11/2010 | Park .................... | G02B 6/0091 362/606 |

(Continued)

FOREIGN PATENT DOCUMENTS

| TW | 201027190 A | 7/2010 |
|---|---|---|
| TW | 201027190 B2 | 2/2013 |
| TW | 201500686 A | 1/2015 |

*Primary Examiner* — Bryon T Gyllstrom
(74) *Attorney, Agent, or Firm* — McClure, Qualey & Rodack, LLP

(57) ABSTRACT

An electronic device includes a circuit board and a metal reflective structure. The metal reflective structure is disposed on the circuit board. The metal reflective structure includes a protective layer and a metal layer. The metal layer is located between the protective layer and the circuit board. The protective layer includes transparent materials.

18 Claims, 17 Drawing Sheets

(56) References Cited

U.S. PATENT DOCUMENTS

| | | | | |
|---|---|---|---|---|
| 2011/0157879 A1* | 6/2011 | Chang | ............... | G02B 6/0091 |
| | | | | 362/183 |
| 2012/0274879 A1* | 11/2012 | Jinbo | ............... | H01L 27/1266 |
| | | | | 349/69 |
| 2013/0182413 A1* | 7/2013 | Shin | ............... | G02F 1/133606 |
| | | | | 362/97.1 |
| 2013/0258251 A1* | 10/2013 | Lee | ............... | G02F 1/133603 |
| | | | | 349/69 |
| 2014/0376256 A1 | 12/2014 | Lin et al. | | |

* cited by examiner

ELECTRONIC DEVICE

CROSS REFERENCE TO RELATED APPLICATIONS

This application claims priority of China Patent Application No. 201910524835.X, filed Jun. 18, 2019, and claims priority of China Patent Application No. 202010079716.0, filed Feb. 4, 2020, the entirety of which are incorporated by reference herein.

BACKGROUND

Field of the Invention

The present invention relates to an electronic device, and in particular to an electronic device having a metal reflective structure.

Description of the Related Art

The electronic devices are developed to be larger or thinner. However, how to increase the brightness or the brightness uniformity is still an issue to be improved upon.

BRIEF SUMMARY

Some embodiments of the disclosure provide an electronic device, including a circuit board and a metal reflective structure. The metal reflective structure is disposed on the circuit board. The metal reflective structure includes a protective layer and a metal layer. The metal layer is located between the protective layer and the circuit board. The protective layer includes transparent materials.

A detailed description is given in the following embodiments with reference to the accompanying drawings.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE INVENTION

Various embodiments or examples are provided in the following description to implement different features of the present disclosure. The element and arrangement described in the following specific examples merely provided for briefly present the present and serve as examples without limiting the scope of the present disclosure. When a corresponding component (such as a film layer or region) is referred to as "on another component", it may be directly on another component, or there may be other components in between. On the other hand, when a component is called "directly on another component", there is no component between the former two. In addition, when a component is called "on another component", the two components have an up-down relationship in the top view, and this component can be above or below the other component, and this up-down relationship depends on the orientation of the device.

It should be appreciated that when a component or a layer is called "connected to" another component or layer, it may be directly connected to another component, or there may be other inserted components in between. When a component is called "directly connected to another component", there is no inserted component between the former two. In addition, when a component is called "coupled to another component (or its variants)", it may be directly connected to another component, or indirectly connected (such as electrically connected) to another component via one or more component.

Furthermore, same numerals and/or wordings may be used in different embodiments herein. These repetitions are merely for simplicity and clarity, but not intended to represent any relationship between different embodiments and settings.

In this specification, spatial terms may be used, such as "higher" or "lower," for briefly describing the relationship between an element relative to another element in the figures. Besides the directions illustrated in the figures, the devices may be used or operated in different directions. In addition, the shapes, sizes and thickness in the figures may be not drawn to scale or be simplified for illustration.

The terms "about", "equal to", "equal" or "identical", "substantially" or "approximately" are generally interpreted as within 20% of a given value or range, or as interpreted as within 10%, 5%, 3%, 2%, 1%, or 0.5% of a given value or range.

Certain terms may be used throughout the present disclosure and the appended claims to refer to particular elements. Those skilled in the art will understand that electronic device manufacturers may refer to the same components by different names. The present specification is not intended to distinguish between components that have the same function but different names. In the following specification and claims, the words "including", "containing", "having" and the like are open words, so they should be interpreted as meaning "including but not limited to . . . "

Figure 1:
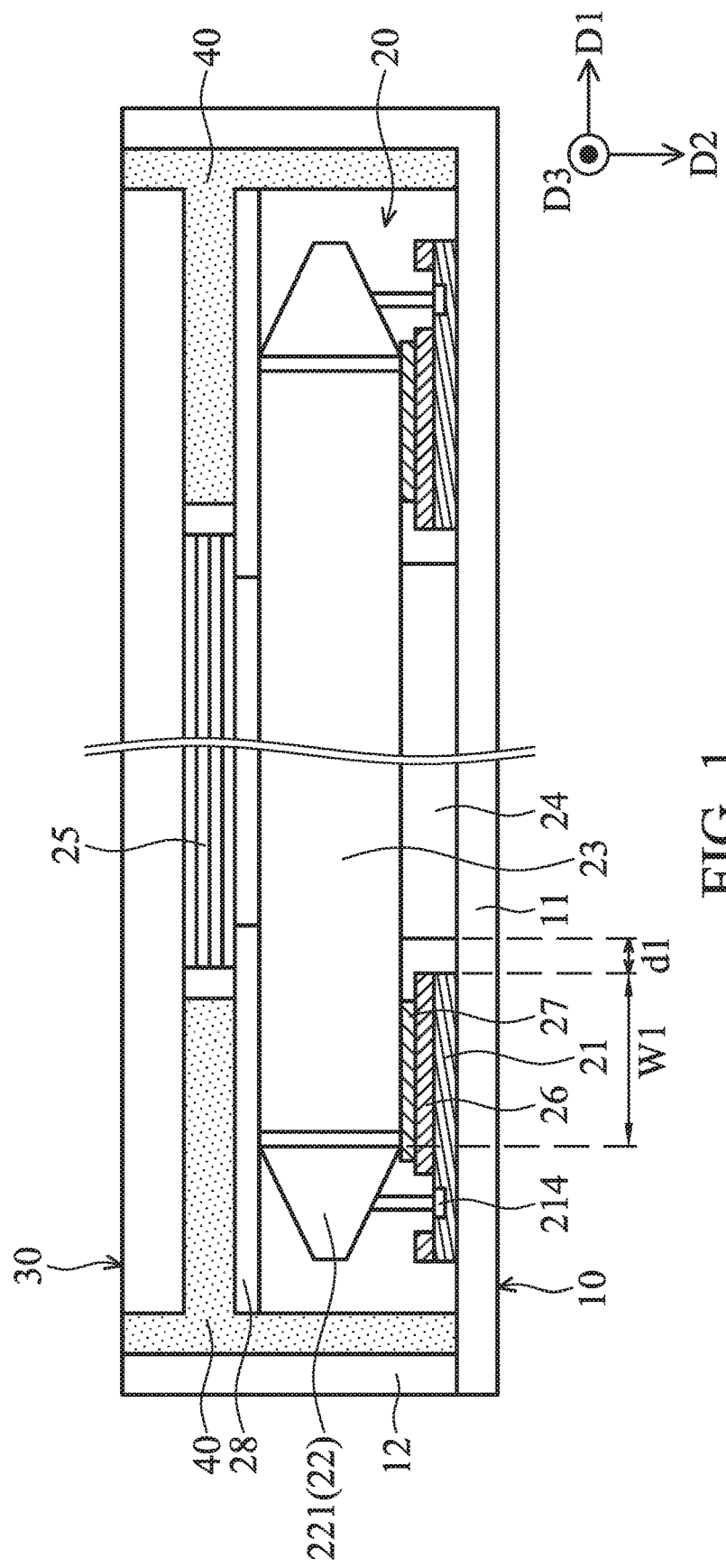
FIG. 1 is a cross-sectional view illustrating an electronic device in accordance with some embodiments of the present disclosure.

FIG. 1 is a cross-sectional view illustrating an electronic device 1 in accordance with some embodiments of the present disclosure. The electronic device 1 may include an electronic device that may be applied to televisions, computers, tablets, cell phones, automotive panels or other various devices.

The electronic device 1 may include a housing 10, a backlight module 20, a panel 30 and a frame 40. The backlight module 20 and the frame 40 are for example disposed in the housing 10, and the frame 40 is for example disposed adjacent to the backlight module 20. In some embodiments, the housing 10 may include a bottom plate 11 and at least one sidewall 12. The sidewall 12 is connected to the bottom plate 11, and for example extends in a direction that is substantially perpendicular to the bottom plate 11, but it is not limited thereto. In some embodiments, an angle between the bottom plate 11 and the sidewall 12 is between 45 degrees and 135 degrees (45 degrees≤the angle≤135 degrees), but it is not limited thereto. The surface of the bottom plate 11 is substantially parallel to the panel 30, but it is not limited thereto. In some embodiments, the housing 10 and the frame 40 are integrally formed, but they are not limited thereto. In some other embodiments (not shown), the sidewall 12 of the housing 10 may be optionally omitted.

Referring to FIG. 1, in some embodiments, the frame 40 may be configured to support the panel 30. In some embodiments, the frame 40 may be disposed adjacent to the sidewall 12 of the housing 10, and a portion of the frame 40 may be located between the backlight module 20 and the panel 30, but it is not limited thereto. In some embodiments, the backlight module 20 may include a circuit board 21, a light source 22, a light guide plate 23, a reflective sheet 24 and/or at least one optical film 25, but it is not limited thereto. In some embodiments, the circuit board 21 may be disposed on and adjacent to the bottom plate 11. In some embodiments (not shown), the circuit board 21 and the bottom plate 11 may be affixed via a bonding layer. In some embodiments, the circuit board 21 overlaps with or corresponds to at least a portion of the bottom plate 11, and the light source 22 is disposed on and electrically connected to the circuit board 21 (such as a conductive pad 214, the detail may be provided as follows), for example. In some embodiments, the circuit board 21 may be a flexible printed circuit board (FPC), but it is not limited thereto.

Referring to FIG. 1, in some embodiments, the light source 22 may be located between the sidewall 12 and the light guide plate 23, or the light source 22 may be located between the frame 40 and the light guide plate 23, but it is not limited thereto. In some embodiments, the light source 22 includes at least one light-emitting element 221. In some embodiments, the light-emitting element 221 may include light-emitting diode (LED) or other suitable light-emitting element, but it is not limited thereto. In some embodiments, the electronic device include multiple light sources 22 and multiple circuit boards 21, and theses light sources 22 and circuit boards 21 are, for example, disposed adjacent to different sides of the light guide plate 23, respectively, but they are not limited thereto. The above arrangement may enhance the uniformity of the light passing through the light guide plate, or increase the amount of the light that exits the light guide plate 23.

Referring to FIG. 1, in some embodiments, the reflective sheet 24 is disposed adjacent to the circuit board 21, and the light guide plate 23 is disposed on the reflective sheet 24 and the circuit board 21, for example. In some embodiments (not shown), an adhesive member may be optionally disposed between the reflective sheet 24 and the light guide plate 23. In some embodiments, the reflectivity of the reflective sheet 24 is in a range from 95% to 99% (95%≤the reflectivity≤99%), but it is not limited thereto. In some embodiments, in a second direction D2, the projected area of the optical film 25 projected onto the housing 10 (such as the bottom 11) may be less than or equal to the projected area of the light guide plate 23 projected onto the housing 10 (such as the bottom 11), but it is not limited thereto. The second direction D2 may be defined as the normal direction of the panel 30. In some embodiments, in the second direction D2, the ratio of the projected area of the light guide plate 23 projected onto the housing 10 (such as the bottom 11) to the projected area of the optical film 25 projected onto the housing (such as the bottom 11) is in a range from about 1 to about 1.4 (1≤the ratio≤1.4), but it is not limited thereto. In some embodiments, in the second direction D2, the ratio of the projected area of the light guide plate 23 projected onto the housing 10 (such as the bottom 11) to the projected area of the optical film 25 projected onto the housing 10 (such as the bottom 11) is in a range from about 1.1 to about 1.3 (1.1≤the ratio≤1.3), but it is not limited thereto. In some embodiments (as shown in following FIG. 12), in the second direction D2, the projected area of the optical film 25 projected onto the housing (such as the bottom 11) may be greater than the projected area of the light guide plate 23 projected onto the housing 10 (such as the bottom 11). In some embodiments (as shown in following FIG. 12), in the second direction D2, the ratio of the projected area of the light guide plate 23 projected onto the housing 10 (such as the bottom 11) to the projected area of the optical film 25 projected onto the housing 10 (such as the bottom 11) is in a range from about 0.7 to about 1 (0.7≤the ratio≤1), but it is not limited thereto. In some embodiments (as shown in following FIG. 12), in the second direction D2, the ratio of the projected area of the light guide plate 23 projected onto the housing 10 (such as the bottom 11) to the projected area of the optical film 25 projected onto the housing 10 (such as the bottom 11) is in a range from about 0.8 to about 1 (0.8≤the ratio≤1).

Referring to FIG. 1, in some embodiments, the backlight module 20 further includes a metal reflective structure 26, an adhesive member 27 and/or a reflective element 28, but it is not limited thereto. In some embodiments, the metal reflective structure 26 is disposed on the circuit board 21. In some embodiments, the metal reflective structure 26 may be disposed between the circuit board 21 and a portion of the light guide plate 23. In some embodiments, in the second direction D2, the metal reflective structure 26, for example, overlaps with at least a portion of the light guide plate 23 (such as the portion of the light guide plate 23 corresponding to the incident side).

In some embodiments, the adhesive member 27 may be disposed between the metal reflective structure 26 and the light guide plate 23 and configured to attach the metal reflective structure 26 and the light guide plate 23.

Referring to FIG. 1, in some embodiments, the reflectivity of the metal reflective structure 26 is in a range from 90% to 99% (90%≤the reflectivity≤99%), but it is not limited thereto. In some embodiments, the reflectivity of the metal reflective structure 26 is in a range from 90% to 95% (90%≤the reflectivity≤95%). In some embodiments, the reflectivity of the metal reflective structure 26 is in a range from 95% to 99% (95%≤the reflectivity≤99%). The metal reflective structure 26 may enhance the amount of the light reflected to the light guide plate 23, reduce the absorbed light or scattering light that may affect the quality of the light, enhance the luminance of the display device, or reduce the power consumption of the backlight module 20.

Referring to FIG. 1, in some embodiments, a distance dl between the metal reflective structure 26 and the reflective sheet 24 is substantially in a range from 0 mm to 1.5 mm (0 mm≤the distance≤1.5 mm), but it is not limited thereto. The distance dl may be defined as the shortest distance between the metal reflective structure 26 and the reflective sheet 24 in a first direction D1, wherein the first direction D1 is substantially perpendicular to the extending direction (such as a third direction D3) of the circuit board 21, and the first direction D1 is perpendicular to the second direction D2, but it is not limited thereto. In some embodiments, the distance dl is substantially in a range from 0 mm to 1 mm (0 mm≤the distance≤1 mm). In some embodiments, the distance dl is substantially in a range from 0 mm to 0.5 mm (0 mm≤the distance≤0.5 mm). In some embodiments, multiple light-emitting elements 221 on the circuit board 21 are, for example, arranged substantially along the third direction D3, but it is not limited thereto. In some embodiments, a distance W1 between the light source 22 and one side (that is adjacent to the light guide plate 23) of the circuit board 21 in the first direction D1 is in a range from about 1 mm to 6 mm (1 mm≤W1≤6 mm). The distance W1 is defined as the shortest distance between the light source 22 and the side (that is adjacent to the light guide plate 23) of the circuit board 21 in the first direction D1. In some embodiments, the distance W1 is in a range from about 2 mm to 4 mm (2 mm≤W1≤4 mm).

Referring to FIG. 1, in some embodiments, the reflective element 28 is disposed on or stuck to (or affixed to) a portion of the frame 40. For example, the reflective element 28 is disposed adjacent to the light source 22, such as the reflective element 28 may be disposed on the light source 22. In some embodiments, the reflective element 28 is disposed on the light source 22 and a portion of the light guide plate 23. In some embodiments, the reflective element 28 overlaps with the light source 22 and a portion of the light guide plate 23 in the second direction D2. In some embodiments, in the second direction D2, the reflective element 28 is disposed between the optical film 25 and the light guide plate 23, but it is not limited thereto. In some embodiments, the reflective element 28 may contact or not contact a portion of the optical film 25 (and/or a portion of the light guide plate 23). In some embodiments, in the first direction D1, the reflective element 28 may be level with the frame 40 or protrude from the frame (i.e. a portion of the reflective element 28 does not overlap with the frame 40).

Figure 2:
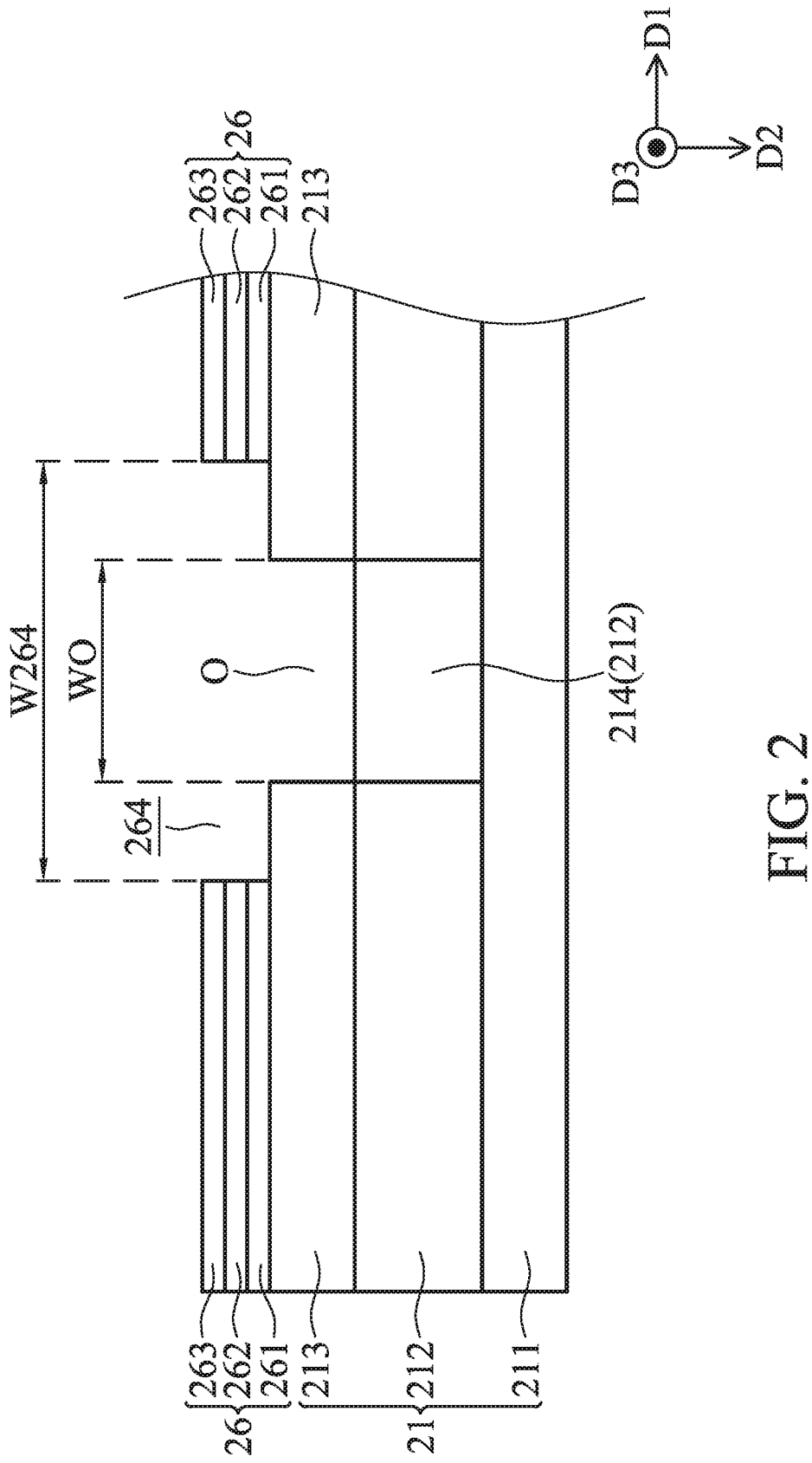
FIG. 2 is a cross-sectional view illustrating a circuit board and a metal reflective structure in accordance with some embodiments of the present disclosure.

Please refer to FIG. 2, which is a cross-sectional view illustrating the circuit board 21 and the metal reflective structure 26 in the present disclosure. The circuit board 21 includes a first dielectric layer 211, a conductive layer 212 (including a conductive pad 214), a second dielectric layer 213, but it is not limited thereto. The circuit board 21 may include other dielectric layers, conductive layers or other suitable layers as required. In some embodiments, the first dielectric layer 211 may be adjacent to the bottom plate 11 (as shown in FIG. 1), and the conductive layer 212, the second dielectric layer 213 are disposed on the first dielectric layer 211 sequentially, but they are not limited thereto. In some embodiments, the second dielectric layer 213 has an opening O, a portion of the conductive layer 212 is exposed from the opening O, and the exposed portion of the conductive layer 212 from the opening O is defined as the conductive pad 214, for example. In some embodiments, the light-emitting element 221 may be electrically connected to the conductive pad 214. In some embodiments, the metal reflective structure 26 may include an adhesive layer, a metal layer 262, and a protective layer 263, but it is not limited thereto. The metal reflective structure 26 may include other suitable layers as required. In some embodiments, the metal reflective structure 26 is stuck onto the circuit board 21 via the adhesive layer 261, and the metal layer 262 and the protective layer 263 are sequentially disposed on the adhesive layer 261, for example. That is, the metal layer 262 may be located between the protective layer 263 and the circuit board 21, and the protective layer 263 is away from the circuit board 21, but it is not limited thereto. Other layers may be inserted between the above layers of the metal reflective structure 26. In some embodiments, the adhesive layer 261 of the metal reflective structure 26 may be optionally removed. In some embodiments, the material of the metal layer 262 includes silver, gold, other suitable materials or a combination thereof, but it is not limited thereto. In some embodiments, the thickness of the metal layer 262 is in a range from about 0.1 μm to about 1.5 μm (0.1 μm the thickness 1.5 μm), but it is not limited thereto. In some embodiments, the thickness of the metal layer 262 is in a range from about 0.1 μm to about 1 μm (0.1 μm≤the thickness≤1 μm). In some embodiments, the material of the protective layer 263 includes transparent materials, insulating materials, other suitable materials or a combination thereof, but it is not limited thereto. In some embodiments, the material of the protective layer 263 may include polyimide (PI), silicon mononitride (SiN), silicon dioxide (SiO$_2$), other suitable materials or a combination thereof, but it is not limited thereto. In some embodiments, the thickness of the protective layer 263 is in a range from about 9 μm to about 15 μm (9 μm≤the thickness≤15 μm). In some embodiments, the metal reflective structure 26 and the circuit board 21 (such as the conductive layer 212) are electrically insulated from each other, reducing the possibility that a short circuit is generated between the metal reflective structure 26 and the circuit board 21 (and the light-emitting element 221). It is noted that the thickness of the layers in the metal reflective structure 26 is defined as the maximum thickness of the layers in the second direction D2, and the maximum thickness may be measured by scanning electron microscope (SEM) images in any cross-section. For example, an A layer (the target to be measured) is located between a B layer and a C layer, and therefore at least a portion of the B layer and at least a portion of the C layer are shown in the SEM images. The thickness of the A layer may be obtained by the maximum thickness of the A layer measured in the SEM images, but it is not limited thereto. Similarly, the measurement for the thickness described in the following paragraphs may be performed under SEM images in any cross-section, and the thickness may be obtained by measuring the maximum thickness or the minimum thickness of the layer (or element, structure) as defined above.

Referring to FIG. 2, in some embodiments, the metal reflective structure 26 may has a via hole 264 which may penetrate the adhesive layer 261, the metal layer 262 and the protective layer 263, for example. In some embodiments, the conductive pad 214 may overlap the via hole 264 in the second direction D2. In other words, the conductive pad 214 may be exposed by the via hole 264, and the width W264 of the via hole 264 is greater than the width WO of the opening O of the second dielectric layer 213, for example. As such, the possibility that the metal reflective structure 26 is electrically connected to the conductive pad 214 (or the circuit board 21) or a short circuit is generated may be reduced. The width W264 may be defined as under a cross-section, the maximum width in a direction (such as the first direction D1 or any other suitable direction that is parallel to the second direction D2). The width WO may be defined as under a cross-section, the maximum width in the direction. The width W264 and the width WO are measured in the same direction, for example.

Figure 3:
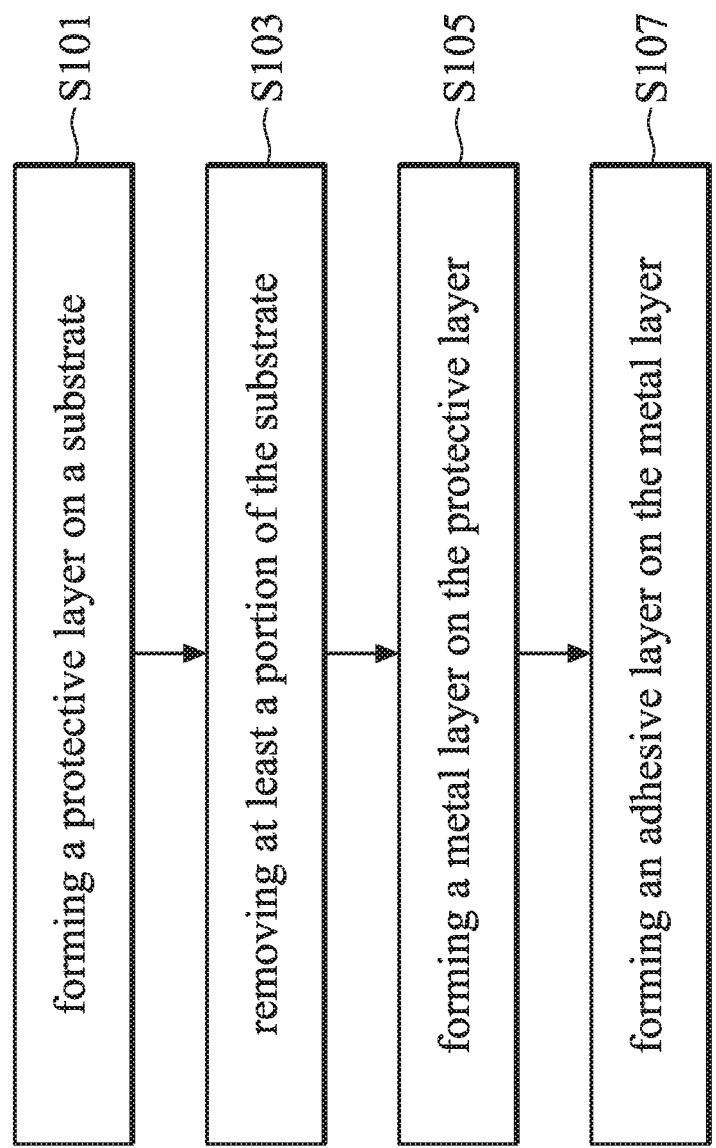
FIG. 3 is a flow chart illustrating the manufacturing method of the metal reflective structure in accordance with some embodiments of the present disclosure.
Figure 4A:
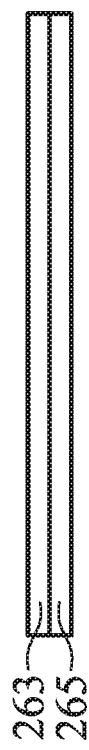
FIG. 4A to 4D are schematic views illustrating the manufacturing method of the metal reflective structure in accordance with some embodiments of the present disclosure.
Figure 4B:
Figure 4C:
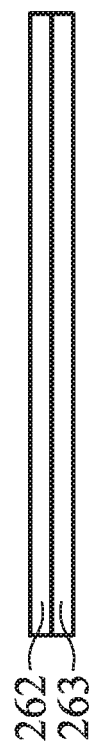
Figure 4D:
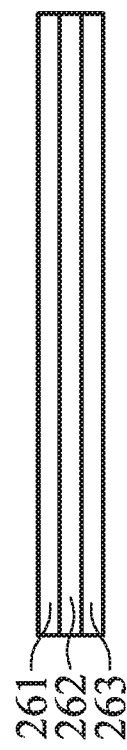

Please refer to FIG. 3, which is a flow chart illustrating the manufacturing method of the metal reflective structure 26 in accordance with some embodiments of the present disclosure. FIG. 4A to 4D are schematic views illustrating the manufacturing method of the metal reflective structure 26 in accordance with some embodiments of the present disclosure. At step S101, as shown in FIG. 4A, a protective layer 263 is formed on a substrate 265. At step S103, as shown in FIG. 4B, at least a portion of the substrate 265 is removed. The substrate 265 may be removed by polishing or other suitable methods, and thereby the thickness of the metal reflective structure 26 may be reduced. In some embodiments, the step S103 may be omitted to remain the substrate 265. At step S105, as shown in FIG. 4C, a metal layer 262 is formed on the protective layer 263 by evaporation or other suitable methods, for example. As step S107, as shown in FIG. 4D, an adhesive layer 261 is formed on the metal layer 262 to form the metal reflective structure 26. Afterwards, the metal reflective structure 26 may be, for example, stuck onto the circuit board 21 via the adhesive layer 261, and the metal reflective structure 26 is stuck in front of the circuit board 21. The above via hole 264 may be formed in the metal reflective structure 26 as required. In some embodiments (not shown), the via hole 264 is formed by punching, laser drilling or other suitable methods, for example. In some embodiments, the step S105 and/or the step S107 may also be performed prior to the step S103 as required.

Figure 5:
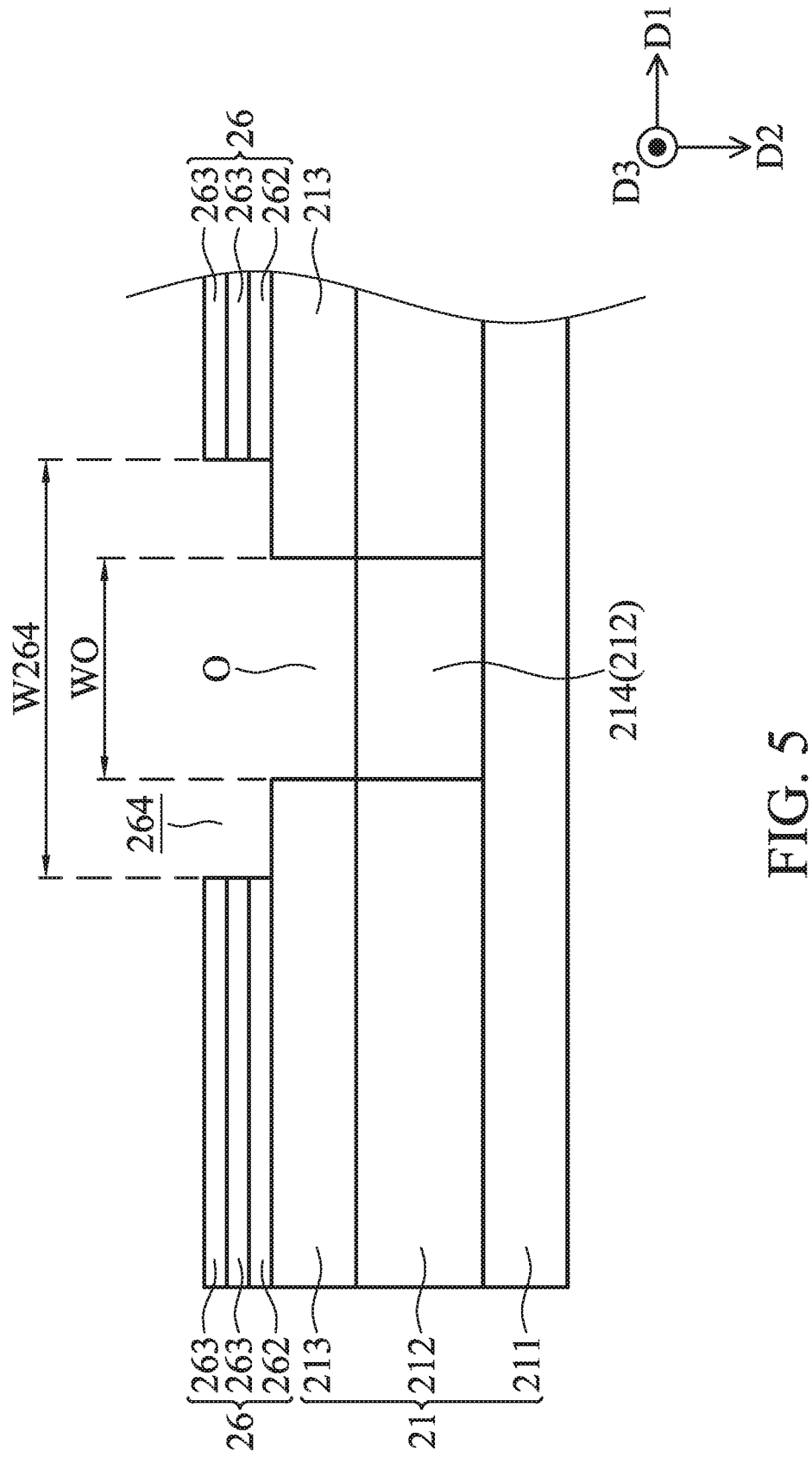
FIG. 5 is a cross-sectional view illustrating the circuit board and the metal reflective structure in accordance with some other embodiments of the present disclosure.

Please refer to FIG. 5, which is a cross-sectional view illustrating the circuit board 21 and the metal reflective structure 26 in accordance with some other embodiments of the present disclosure. In the present embodiment, the metal reflective structure 26 may not include the adhesive layer 261, and the metal layer 262 may be formed on the circuit board 21 (such as on the second dielectric layer 213) by evaporation, but it is not limited thereto. In some embodiments, the metal reflective structure 26 may include at least one protective layer 263. In the present embodiment, the metal reflective structure 26, for example, includes two protective layers 263, but it is not limited thereto. The material and thickness of different protective layers 263 may be the same or different. In some embodiments, different protective layers 263 may be in direct contact or not. For example, an adhesive layer may be disposed between different protective layers 263, such that the protective layers 263 do not contact each other, but the present disclosure is not limited thereto.

Figure 6:
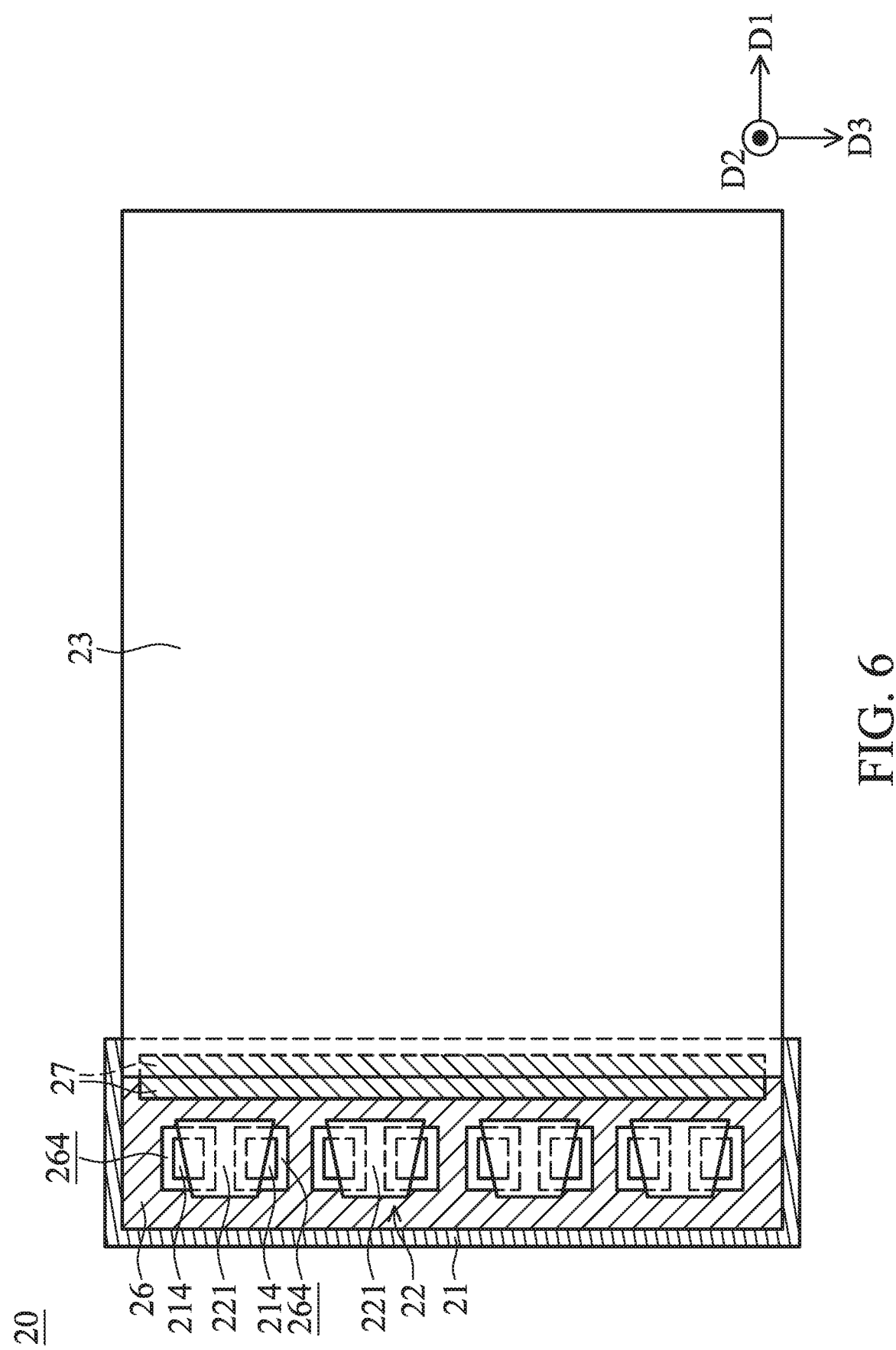
FIG. 6 is a partial top view illustrating a backlight module in accordance with some embodiments of the present disclosure.

Please refer to FIG. 6, which is a partial top view illustrating the backlight module 20 in accordance with some embodiments of the present disclosure. In some embodiments, the circuit board 21 may have an elongated structure and extend along the third direction D3, but it is not limited thereto. In some embodiments, the third direction D3 may be substantially perpendicular to the first direction D1 and/or the second direction D2, but it is not limited thereto. In some embodiments, multiple light-emitting elements 221 may be arranged on the circuit board 21, but it is not limited thereto. More specifically, the light-emitting elements 221 may, for example, correspond to two adjacent conductive pads 214 in the circuit board 21, and the conductive pads (not shown) of the light-emitting elements 221 are electrically connected to the corresponding conductive pads 214, but they are not limited thereto. In some embodiments, the light-emitting elements 221 at least partially overlap with the adjacent conductive pads 214, for example. In some embodiments, the conductive pads 214 are arranged along the third direction D3, for example. In some embodiments, multiple via holes 264 of the metal reflective structure 26 are arranged substantially along the third direction D3, for example. In some embodiments, the via holes 264 may overlap the conductive pads 214 in the second direction D2. In some embodiments, the projected area of the via holes 264 onto the circuit board 21 may be, for example, greater than the projected area of the conductive pads 214 onto the circuit board 21. In some embodiments, the shape of the via holes 264 projected onto the circuit board 21 may be the same as or different from the shape of the conductive pads 214 projected onto the circuit board 21, but it is not limited thereto. In some embodiments, in the second direction D2, the conductive pads 214 may be not overlap with the light-emitting elements 221 partially. That is, the projected area of the conductive pads 214 onto the circuit board 21 may be partially located outside the projected area of the light-emitting elements 221 onto the circuit board 21, but it is not limited thereto. In some embodiments (not shown), the projected area of the conductive pads 214 onto the circuit board 21 may be completely located in the projected area of the light-emitting elements 221 onto the circuit board 21, but it is not limited thereto.

Referring to FIG. 6, in some embodiments, the adhesive member 27 may have an elongated structure, but it is not limited thereto. In some embodiments (not shown), in the second direction D2, the adhesive member 27 may have, for example, a waved-shape or an irregular shape. In some embodiments, the adhesive member 27 may be disposed between at least a portion of the metal reflective structure 26 and at least a portion of the light guide plate 23, or the adhesive member 27 may be disposed between at least a portion of the circuit board 21 and at least a portion of the light guide plate 23. As such, the circuit board 21 may be attached to the light guide plate 23 via the adhesive member 27, reducing the possibility of inappropriate movement between the light guide plate 23 and the circuit board 21 that causes nearby elements collided or damaged, or reducing the assembly processes.

Figure 7:
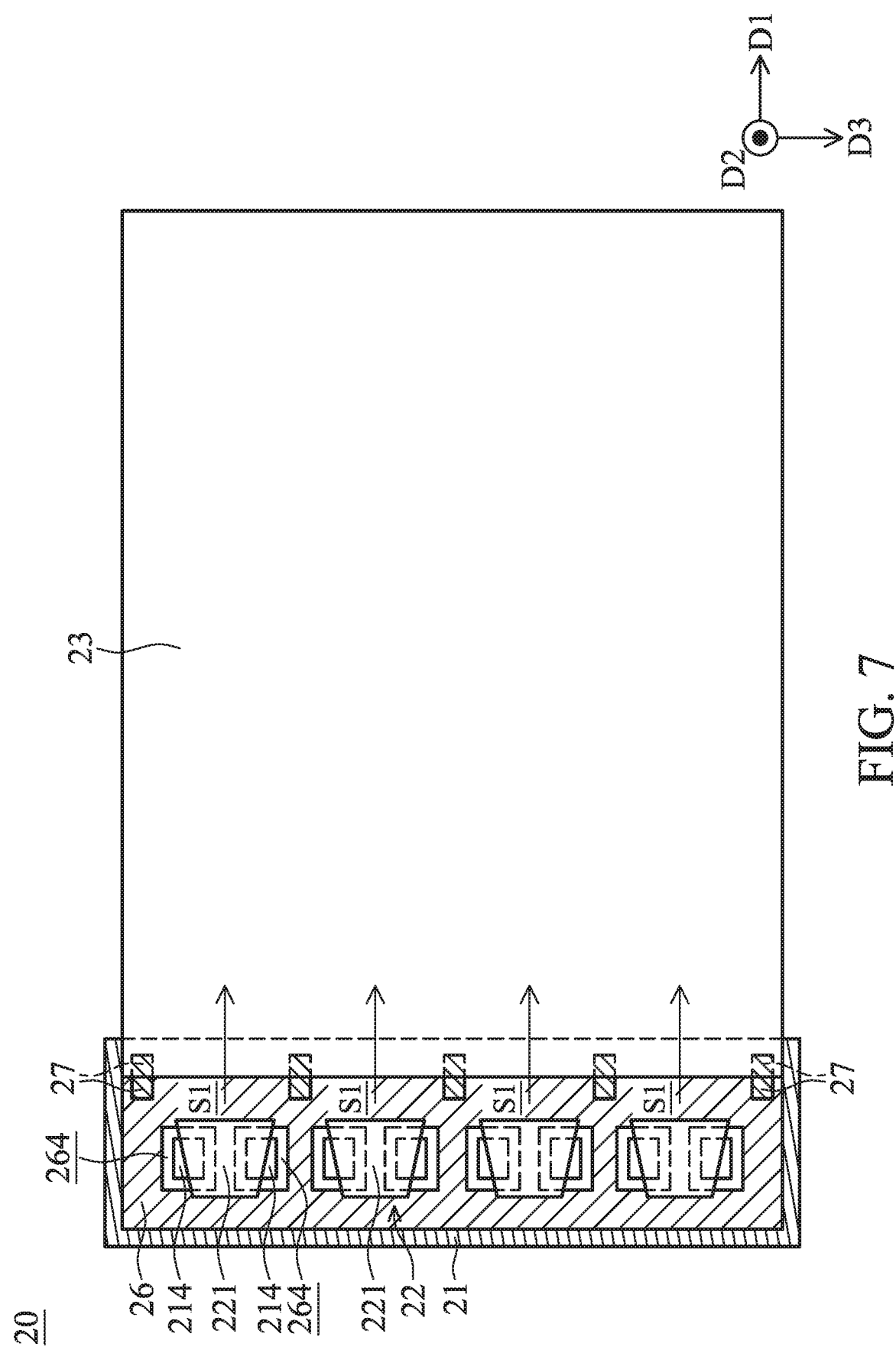
FIG. 7 is a partial top view illustrating the backlight module in accordance with some other embodiments of the present disclosure.

Please refer to FIG. 7, which is a partial top view illustrating the backlight module 20 in accordance with some other embodiments of the present disclosure. The structure shown in FIG. 7 is similar to the structure shown in FIG. 6, and one of the differences is that the backlight module 20 may include multiple adhesive members 27 in FIG. 7. The adhesive members 27 may be disposed adjacent to the light-emitting elements 221, for example. In some embodiments, the adhesive members 27 may be arranged substantially along the third direction D3, but they are not limited thereto. In some embodiments, in the second direction D2, the adhesive members 27 and the light-emitting elements 221 may be disposed in a staggered manner. In some embodiments, the light-emitting elements 221 have an illuminating surface towards the light guide plate 23, and an illuminated space Si is formed. For example, the illuminated space Si and the adhesive members 27 may not overlap in the first direction D1, but they are not limited thereto. In some embodiments (not shown), the light-emitting elements 221 and the adhesive members 27 may not overlap or slightly overlap in the first direction D1. For example, the ratio of a portion of the light-emitting element 221 that overlaps the adhesive member 27 to the whole light-emitting element 221 is in a range from 0% to 20% (0%≤the ratio≤20%) or from 0% to 10% (0%≤the ratio≤10%), but it is not limited thereto. The range of the ratio may be adjusted as required. The above design may reduce the consumption of the light emitted from the light-emitting elements 221 due to passing through the adhesive member 27, or enhance the amount of the light of the light-emitting elements 221 that is incident to the light guide plate 23. In some embodiments, when viewed from a top view (or in the second direction D2), the adhesive members 27 and the light-emitting elements 221 are not aligned, and the adhesive members 27 are closer to the light guide plate 23 than the light-emitting elements 221. In some embodiments, the adhesive members 27 include light-curing adhesive, thermal-curing adhesive, photothermal-curing adhesive, moisture-curing adhesive, tape, other suitable material or a combination thereof, but it is not limited thereto. In some embodiments, the adhesive members 27 includes optical clear adhesive (OCA), optical clear resin (OCR), acrylic resin, other suitable material or a combination thereof, but it is not limited thereto. In some embodiments, the backlight module 20 may not include any adhesive member 27.

Figure 8:
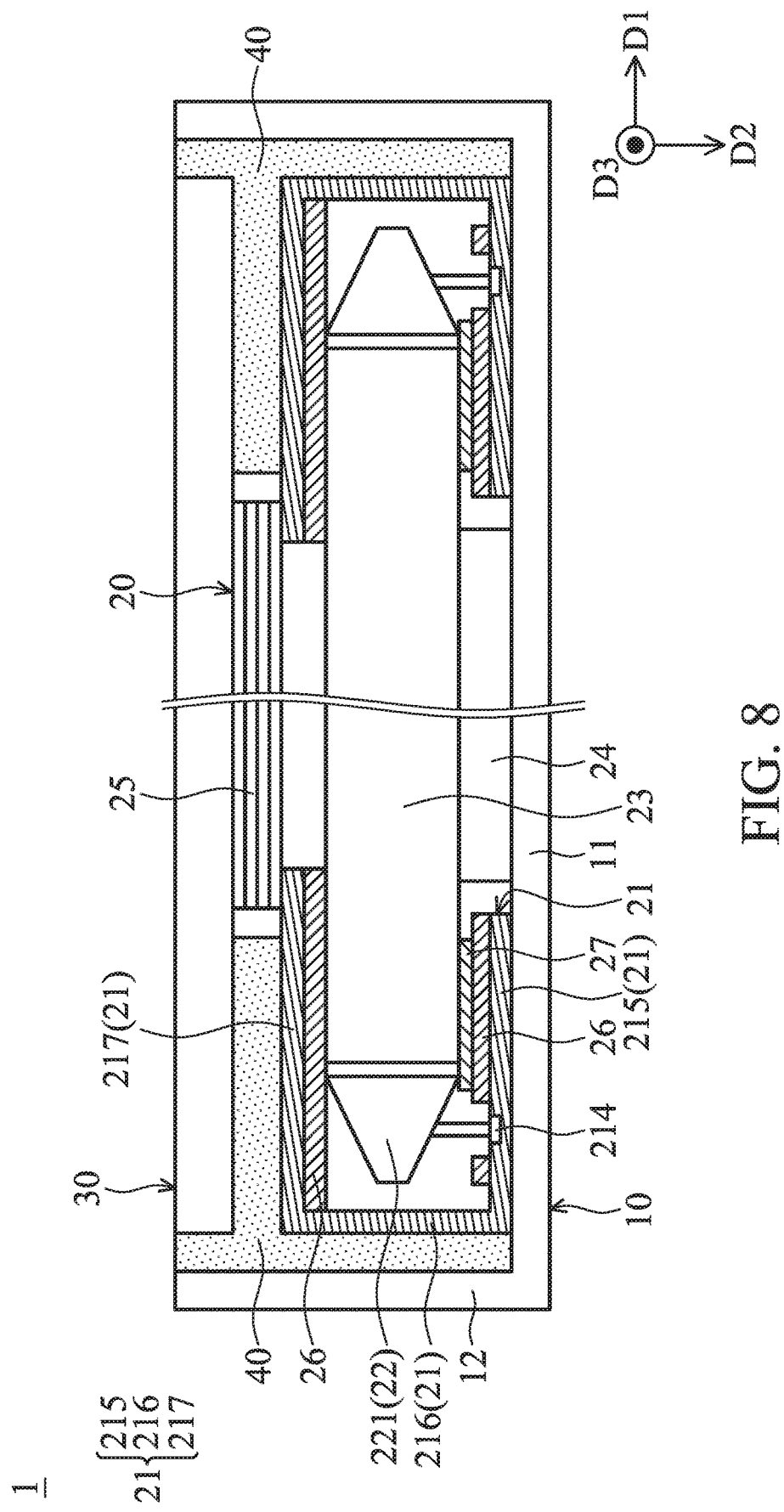
FIG. 8 is a cross-sectional view illustrating the electronic device in accordance with some other embodiments of the present disclosure.

Please refer to FIG. 8, which is a cross-sectional view illustrating the electronic device 1 in accordance with some other embodiments of the present disclosure. As shown in FIG. 8, the circuit board 21 includes a bottom portion 215, a bent portion 216 and a top portion 217. The bottom portion 215 is adjacent to the bottom plate 11 of the housing 10, for example. The bent portion 216 is connected to the bottom portion 215 and the top portion 217, and the bent portion 216 may be disposed substantially adjacent to the sidewall 12 of the housing 10. The top portion 217 is disposed relative to the bottom portion 215, or the top portion 217 may be disposed adjacent to the panel 30. In some embodiments, a portion of the light guide plate 23 and/or a portion of the light source 22 may be located between the bottom portion 215 and the top portion 217, for example. In some embodiments, the bottom portion 215 and the top portion 217 may be substantially parallel to the light guide plate 23 or the panel 30. In some embodiments (not shown), the connecting region between the bent portion 216 and the bottom portion 215 and/or between the bent portion 216 and the top portion 217 may have a curved shape, but it is not limited thereto.

Referring to FIG. 8, in some embodiments, the metal reflective structure 26 may be disposed corresponding to the bottom portion 215, the bent portion 216 and/or the top portion 217, for example. In some embodiments, the metal reflective structure 26 may be integrally formed and be a patterned metal reflective structure 26. The patterned metal reflective structure 26 is formed by forming via holes (such as via holes 264 shown in FIG. 7) in the metal reflective structure 26, for example. In some embodiments (not shown), the electronic devices may include multiple metal reflective structures 26, which may be disposed on different portions (such as the bottom portion 215 and the top portion 217) of the circuit board 21, respectively. In some embodiments, when the metal reflective structure 26 is disposed corresponding to the top portion 217, the reflective element 28 (as shown in FIG. 1) may be optionally removed, reducing the elements or processes of assembly.

Figure 9:
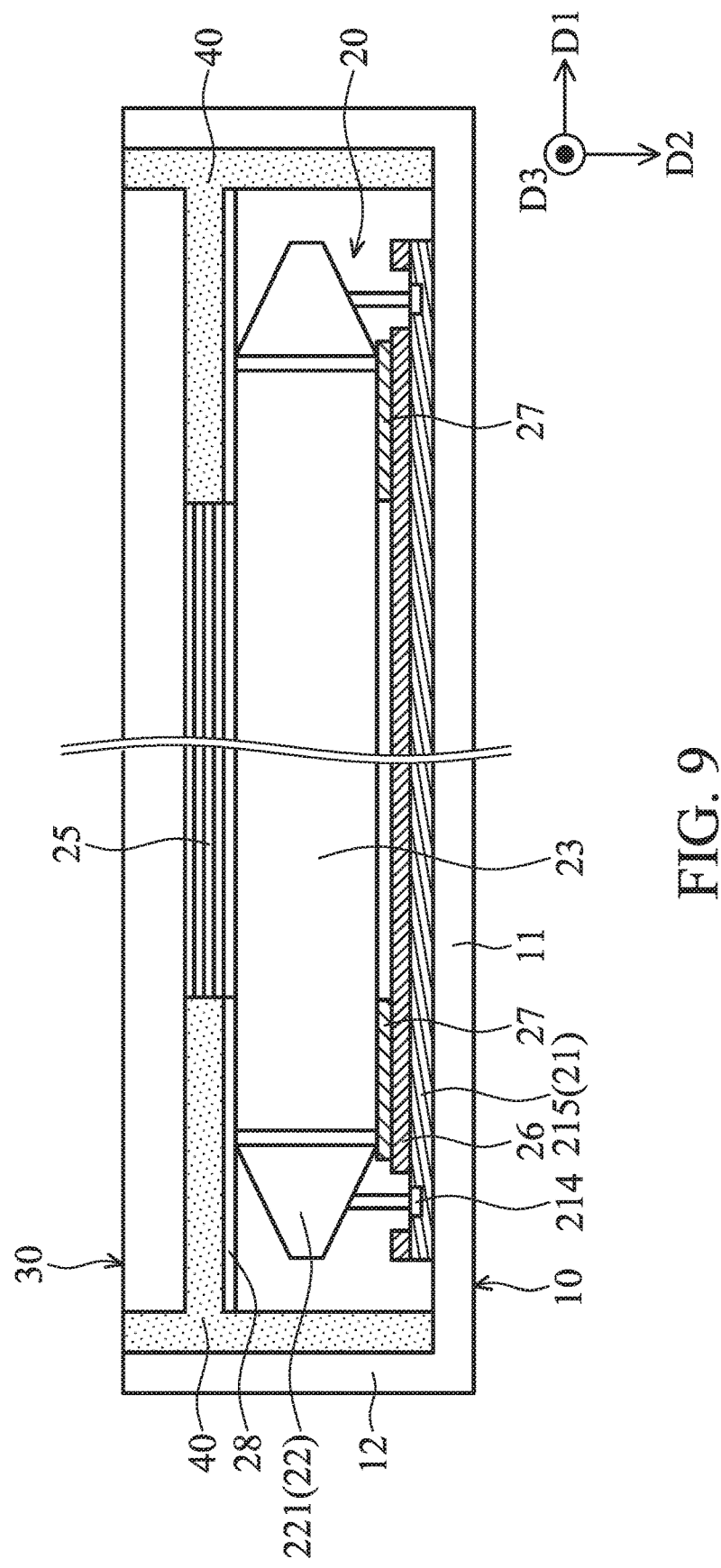
FIG. 9 is a cross-sectional view illustrating the electronic device in accordance with some other embodiments of the present disclosure.

Please refer to FIG. 9, which is a cross-sectional view illustrating the electronic device 1 in accordance with some other embodiments of the present disclosure. In the embodiments shown in FIG. 9, the projected area of the bottom portion 215 of the circuit board 21 onto the bottom plate 11 may be, for example, greater than the projected area of the light guide plate 23 onto the bottom plate 11. The electronic device includes multiple light sources 22, which may be disposed adjacent sides (such as the opposite sides, but it is not limited thereto) of the light guide plate 23, respectively. In some embodiments, the projected area of the metal reflective structure 26 onto the bottom plate 11 may be, for example, greater than or equal to the projected area of the light guide plate 23 onto the bottom plate 11. The above design may help for removing the reflective sheet 24 (as shown in FIG. 1) of the backlight module 20, and thereby the assembly of the backlight module 20 may be simplified. In addition, the distance dl (that is the distance dl between the reflective plate and the circuit board 21, as shown in FIG. 1) may be not present in the present embodiment, and therefore the amount of the light emitted from the light guide plate 23 may be increased.

Figure 10:
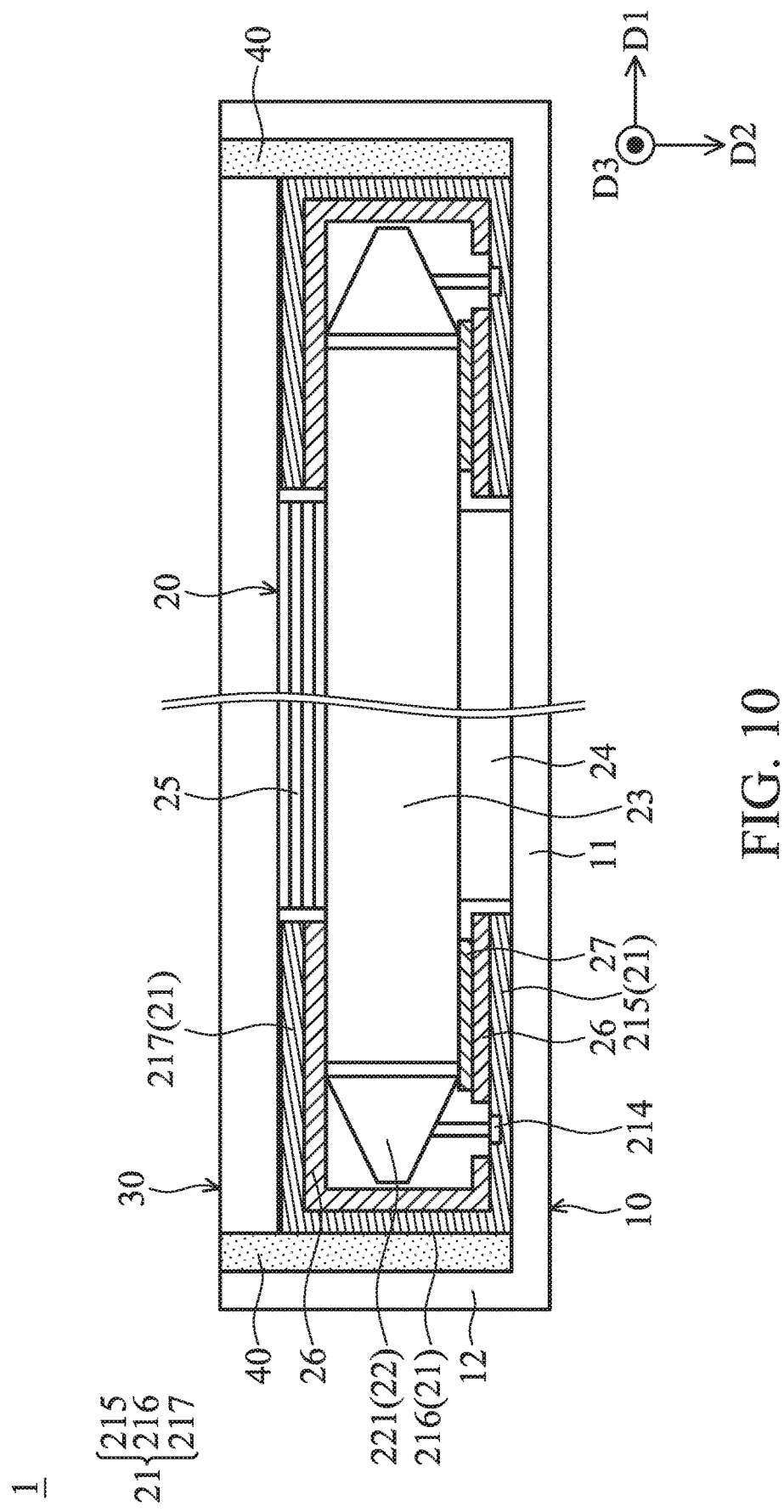
FIG. 10 is a cross-sectional view illustrating the electronic device in accordance with some other embodiments of the present disclosure.

Please refer to FIG. 10, which is a cross-sectional view illustrating the electronic device 1 in accordance with some other embodiments of the present disclosure. The metal reflective structure 26 in the embodiment shown in FIG. 10 may be disposed corresponding to the bent portion 216 of the circuit board 21. Therefore, the loss of the light emitted from the light source 22 due to passing through the bent portion 216 may be reduced, or the amount of the light that is incident to the light guide plate 23 may be increased.

Figure 11:
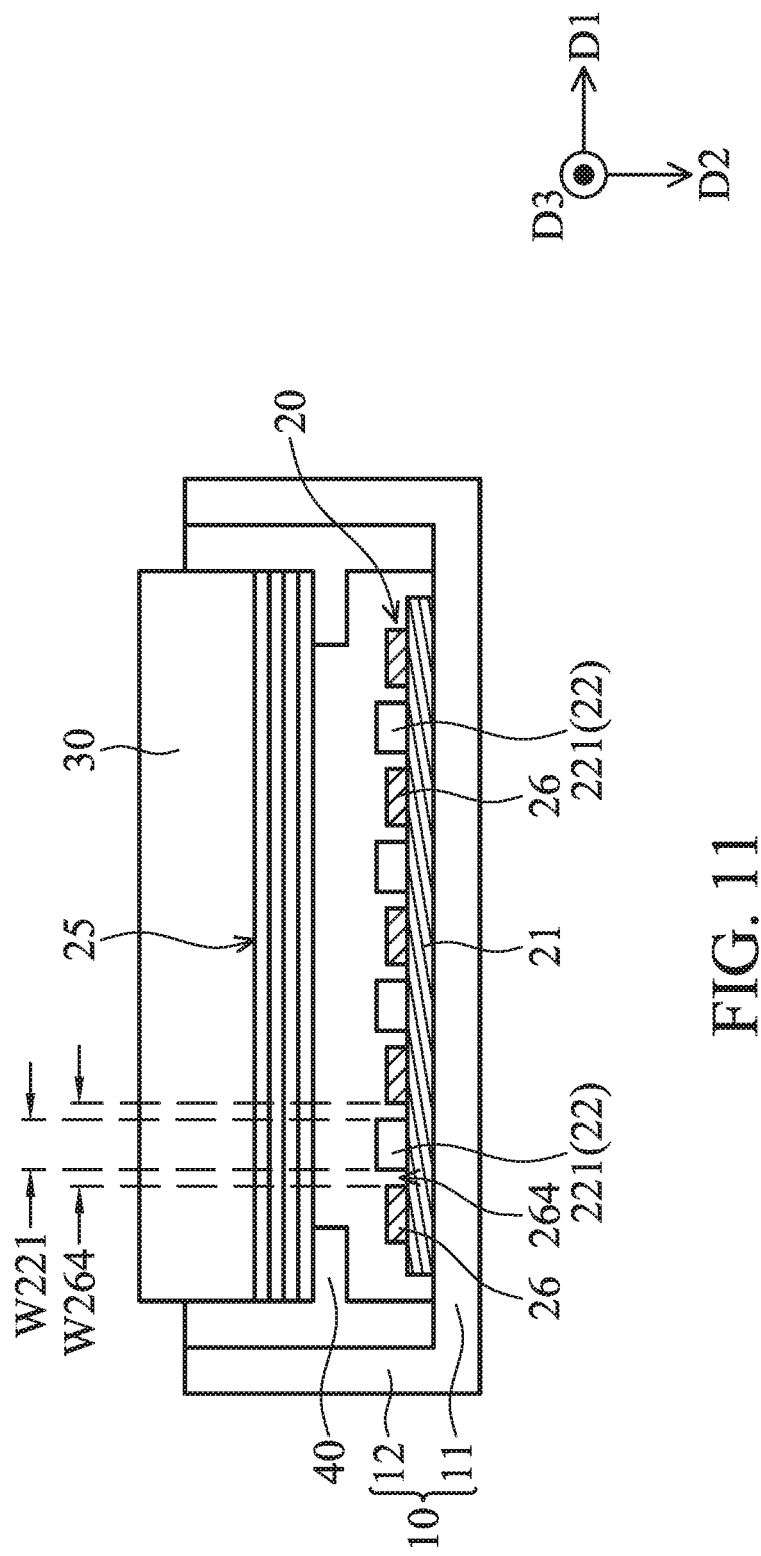
FIG. 11 is a cross-sectional view illustrating the electronic device in accordance with some other embodiments of the present disclosure.

Please refer to FIG. 11, which is a cross-sectional view illustrating the electronic device 1 in accordance with some other embodiments of the present disclosure. The backlight module 20 shown in FIG. 11 may be an upright backlight module 20. The upright backlight module 20 may not include a light guide plate 23, a reflective sheet 24, an adhesive member 27 and/or a reflective element 28, and the circuit board 21, the metal reflective structure 26 and the light-emitting elements 221 may be located between the bottom plate 11 of the housing 10 and the panel 30. The metal reflective structure 26 and the light-emitting elements 221 may be disposed on the circuit board 21. In some embodiments, the light-emitting elements 221 may be arranged on the circuit board 21 as an array or in other manners, and the metal reflective structure 26 is disposed adjacent to or surrounding the light-emitting elements 221. It should be noted that the metal reflective structure 26 and the circuit board 21 (or the light-emitting elements 221) have to be electrically insulated from each other. In some embodiments, the via holes 264 of the metal reflective structure 26 overlap with the conductive pads 214 (not shown) in the second direction D2, for example. In some embodiments, the projected area of the via holes 264 onto the circuit board 21 may be, for example, greater than the projected area of the conductive pads 214 (not shown) onto the circuit board 21. In some embodiments, the width W264 of the via holes 264 may be greater than the width of the conductive pads 214 (not shown). In some embodiments (not shown), the projected area of the via holes 264 onto the circuit board 21 may be, for example, greater than or equal to the projected area of the light-emitting elements 221 onto the circuit board 21. In some embodiments, the width W264 of the via holes 264 may be greater than the width W221 of the light-emitting elements 221.

Figure 12:
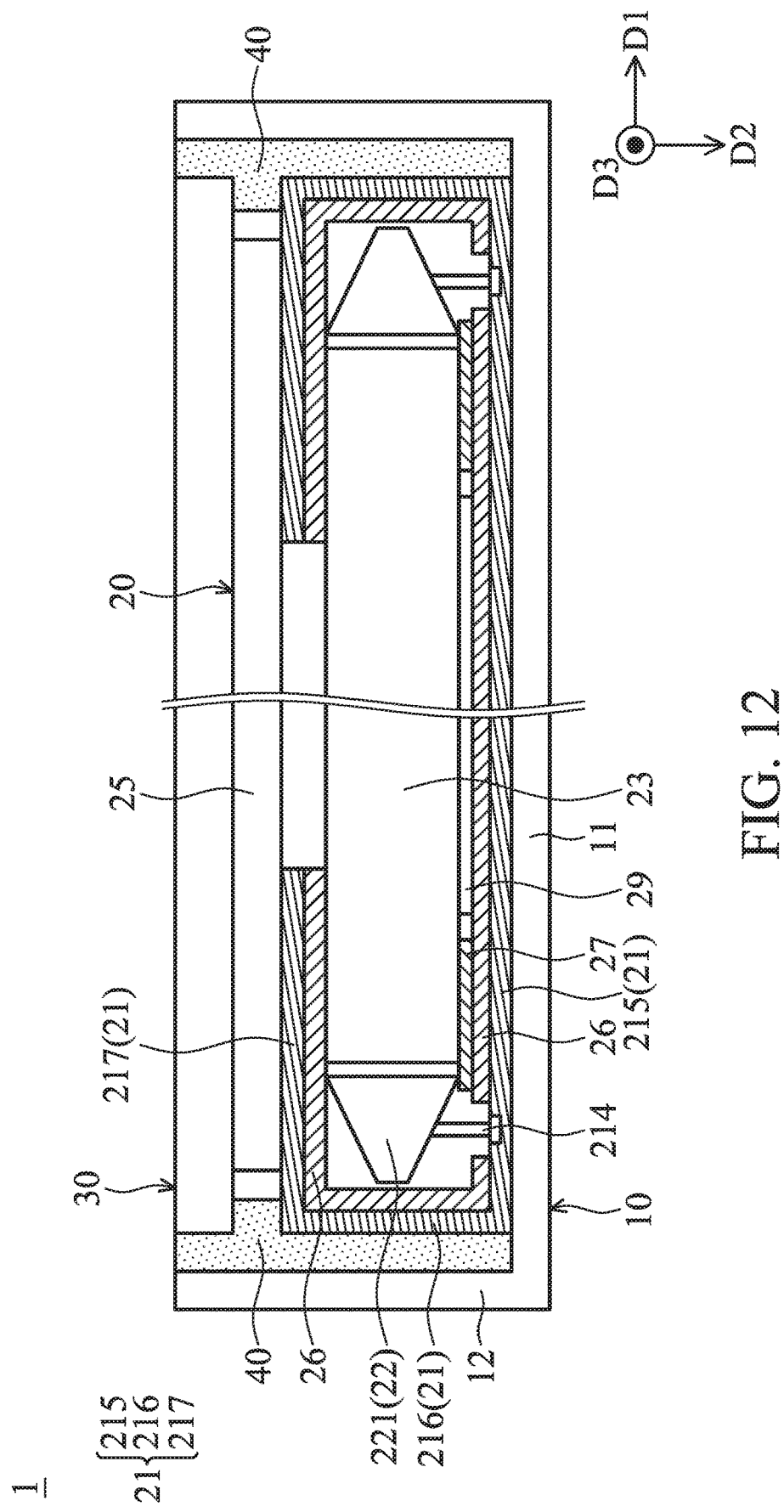
FIG. 12 is a cross-sectional view illustrating the electronic device in accordance with some other embodiments of the present disclosure.

Please refer to FIG. 12, which is a cross-sectional view illustrating the electronic device 1 in accordance with some other embodiments of the present disclosure. In the embodiment shown in FIG. 12, the backlight module 20 may include an optical film 25, which overlaps with the top portion 217 of the circuit board 21 and the light guide plate 23 in the second direction D2, for example. In some embodiments, the projected area of the optical film 25 onto the bottom plate 11 may be, for example, greater than or equal to the projected area of the light guide plate 23 onto the bottom plate 11, but it is not limited thereto. In some embodiments, the optical film 25 may include reverse prism sheet for gathering light, but it is not limited thereto. In some embodiments, an adhesive member (not shown) may be optionally disposed between the optical film 25 and the panel 30, and be configured to stick the optical film 25 onto the panel 30, reducing the assembly processes.

Referring to FIG. 12, in the present embodiment, the backlight module 20 may further include a prism sheet 29 that is disposed below the light guide plate 23. In some embodiments, the prism sheet 29 may be located between the light guide plate 23 and the bottom plate 11. The prism sheet 29 may be configured to adjust the light scattered from the bottom surface (such as the surface that is adjacent to the bottom plate 11) of the light guide plate 23, and thereby the light is reflected to the light guide plate 23 and is further gathered towards the second direction D2, enhancing the gathering of the light, but it is not limited thereto. In some embodiments, the prism sheet 29 may be located between the light guide plate 23 and the circuit board 21 (or the metal reflective structure 26).

Figure 13:
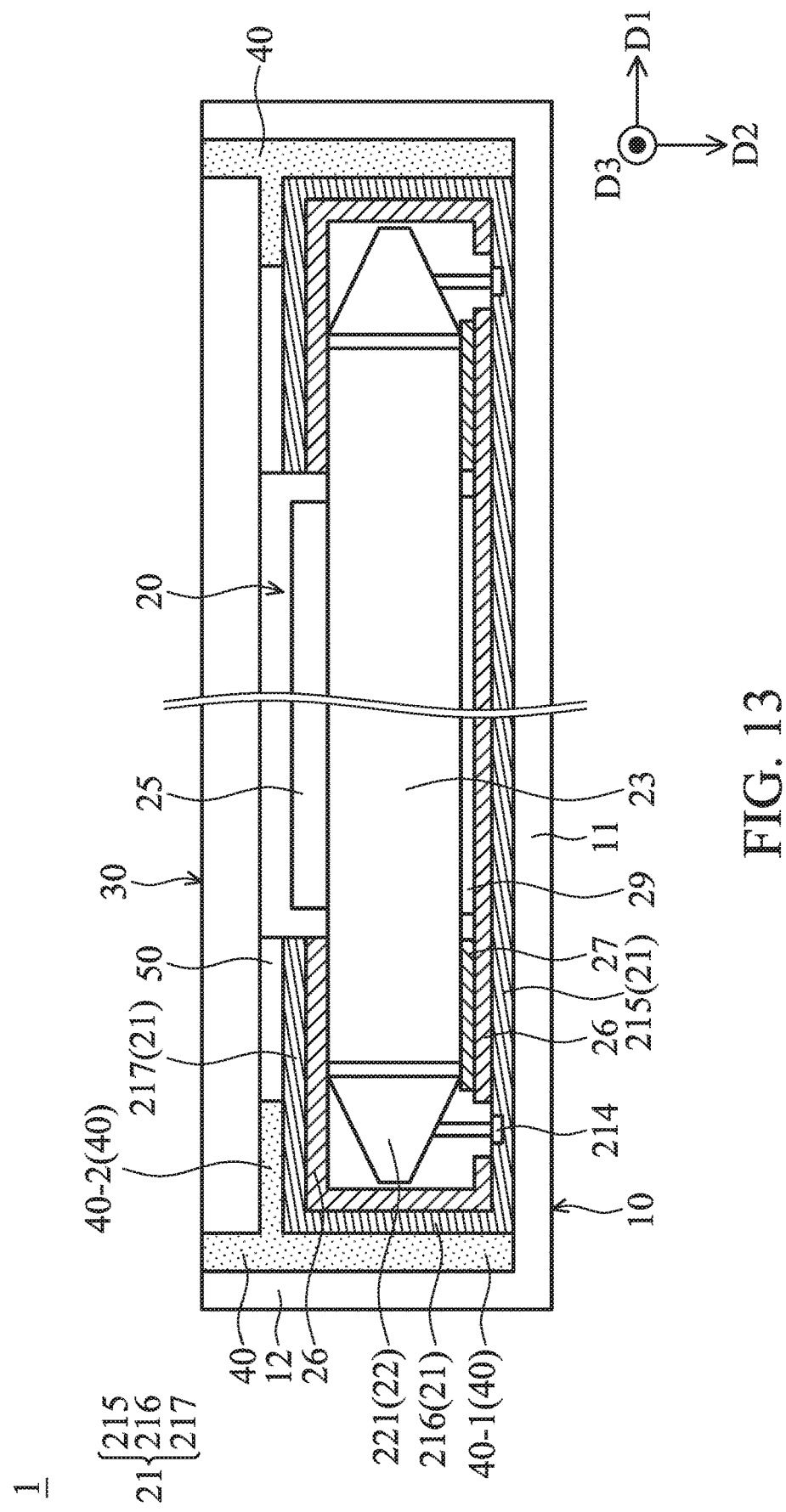
FIG. 13 is a cross-sectional view illustrating the electronic device in accordance with some other embodiments of the present disclosure.

Please refer to FIG. 13, which is a cross-sectional view illustrating the electronic device 1 in accordance with some other embodiments of the present disclosure. In the present embodiments, the electronic device 1 may further include a reinforcing plate 50, and the reinforcing plate 50 may be disposed between a portion of the panel 30 and a portion of the light guide plate 23. The reinforcing plate 50 may be configured to maintain the spacing between the panel 30 and the light guide plate 23, but it is not limited thereto. In some embodiments, the reinforcing plate 50 is disposed between a portion of the panel 30 and a portion of the circuit board 21 (such as the top portion 217), for example. In some embodiments (not shown), when the reinforcing plate 50 is disposed, the frame 40 may be optionally removed. In some embodiments, the material of the reinforcing plate 50 includes buffering element, protective element, adhesive element, other suitable material or a combination thereof, but it is not limited thereto.

Referring to FIG. 13, in some embodiments (not shown), the circuit board 21 may be affixed to a sidewall 40-1 of the frame 40 and/or a protruding portion 40-2 of the frame 40 via an adhesive member (not shown). In some embodiments (not shown), the frame 40 may be optionally removed, and the circuit board 21 may be affixed to the sidewall 12 of the housing 10 via an adhesive member (as shown in FIG. 14).

Figure 14:
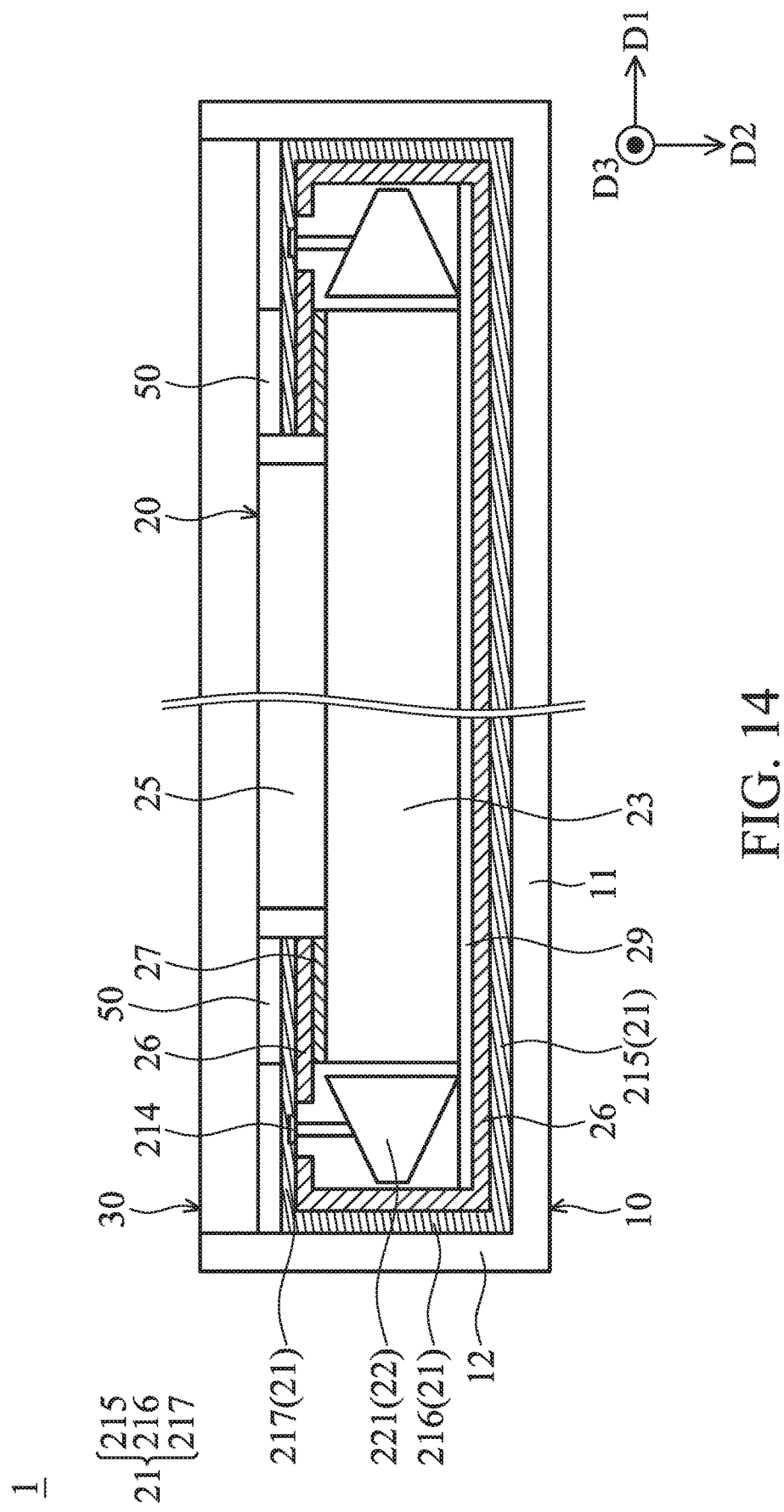
FIG. 14 is a cross-sectional view illustrating the electronic device in accordance with some other embodiments of the present disclosure.

Please refer to FIG. 14, which is a cross-sectional view illustrating the electronic device 1 in accordance with some other embodiments of the present disclosure. In the present embodiment, the backlight module 20 may not include the reflective sheet 24, the reflective element 28 and/or the frame 40 in the backlight module 20 shown in FIG. 1. In some embodiments, the optical film 25 may contact or be stuck on at least one of the light guide plate 23 and the panel 30, and the electronic device 1 may include an adhesive member 27 that is disposed between a portion of the circuit board 21 (such as the top portion 217) and a portion of the light guide plate 23, but the present disclosure is not limited thereto. In some embodiments, the adhesive member 27 is disposed between a portion of the metal reflective structure 26 and a portion of the light guide plate 23, wherein the metal reflective structure 26 is disposed corresponding to the top portion 217 of the circuit board 21. In some embodiments, the adhesive member 27 includes any suitable adhesive material (such as transparent adhesive material), but it is not limited thereto.

Referring to FIG. 14, in some embodiments, the conductive pad 214 is disposed in the top portion 217 of the circuit board 21 correspondingly, and the light source 22 is electrically connected to the circuit board 21 via the conductive pad 214, for example. In some embodiments, the prism sheet 29 and/or the metal reflective structure 26 may overlap with the light source 22 in the second direction D2, but it is not limited thereto.

Figure 15:
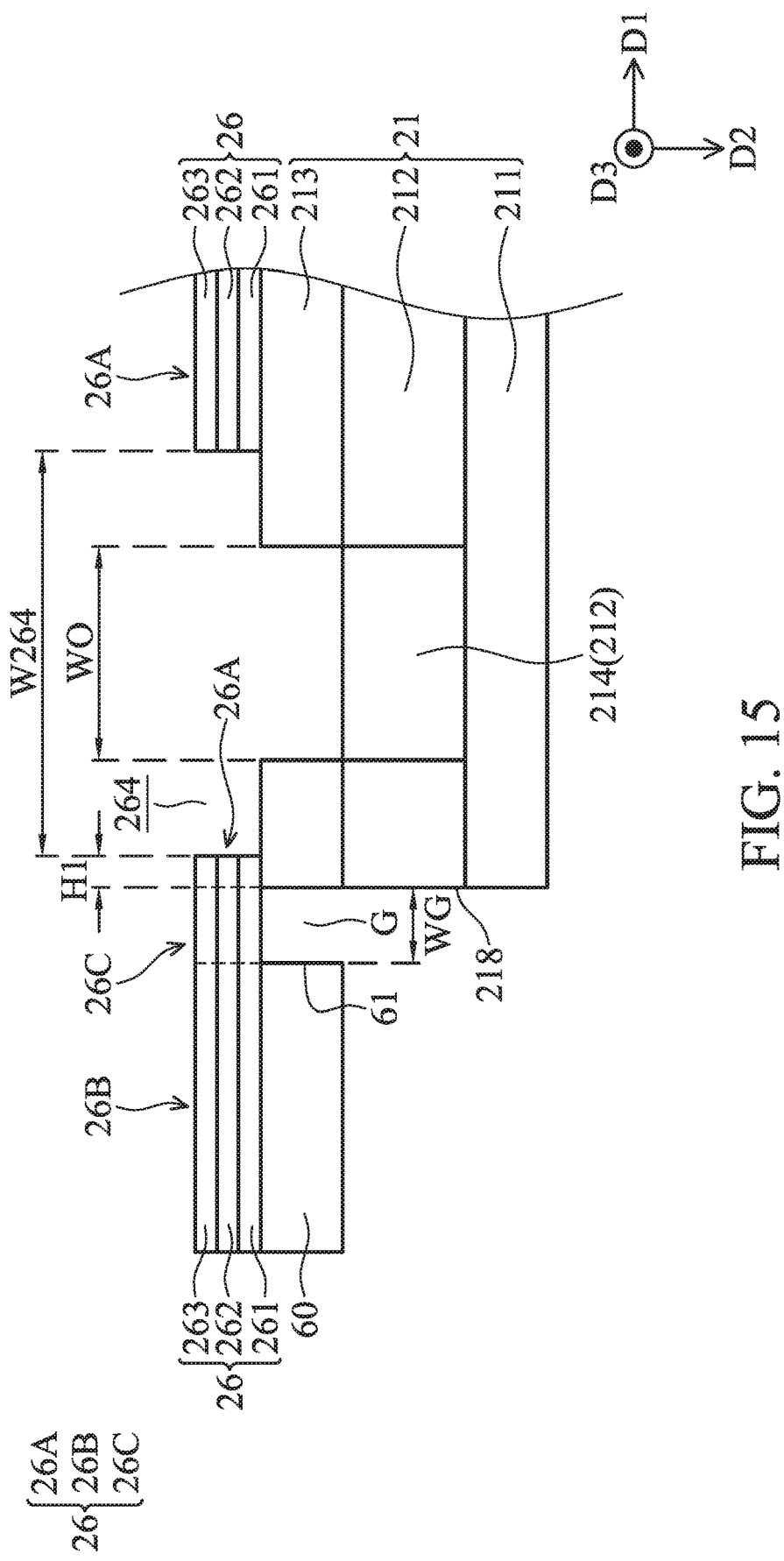
FIG. 15 is a cross-sectional view illustrating the circuit board, the support plate and the metal reflective structure in accordance with some other embodiments of the present disclosure.

Please refer to FIG. 15, which is a cross-sectional view illustrating the circuit board 21, a support plate 60 and the metal reflective structure 26 in accordance with some other embodiments of the present disclosure. It should be noted that the cross-sectional view shown in FIG. 15 illustrates, for example, that the metal reflective structure 26 remains unfold (i.e. planar). It should be appreciate that the metal reflective structure 26 shown in the present embodiment has an adhesive layer 261, a metal layer 262 and/or a protective layer 263, but it merely serves as an example. Those skilled in the art may adjust the structure of the metal reflective structure 26 based on any of the above embodiments, and these adjustments will not be described in detail below. Similarly, the circuit board 21 includes a first dielectric layer 211, a conductive layer 212 (including the conductive pad 214), a second dielectric layer 213 in the present embodiment, but it is not limited thereto. In the present embodiment, the support plate 60 is disposed adjacent to the circuit board 21. In some embodiments, in the second direction D2, the thickness of the support plate 60 is less than the thickness of the circuit board 21. For example, in the second direction D2, a ratio of the thickness of the support plate 60 to the thickness of the circuit board 21 may be in a range from 0.05 to 0.7 (0.05≤the ratio≤0.7), but it is not limited thereto. In some embodiments, in the second direction D2, a ratio of the thickness of the support plate 60 to the thickness of the circuit board 21 may be in a range from 0.1 to 0.5 (0.1≤the ratio≤0.5), wherein the thickness of the support plate 60 and the thickness of the circuit board 21 may be measured when the metal reflective structure 26 is unfold, but the present disclosure is not limited thereto. It should be noted that considering the thickness of the circuit board 21 remains unchanged, the support plate 60 would not provide sufficient support if the ratio of the thickness of the support plate 60 to the thickness of the circuit board 21 is less than 0.05 (i.e. the thickness of the support plate 60 is too small). As such, the yield of the metal reflective structure 26 disposed on the support plate 60 during the bending process may be reduced. The above design for the ratio of the thickness of the support plate 60 to the thickness of the circuit board 21 may make the metal reflective structure 26 more bendable. In some embodiments, a gap G may be optionally formed between the support plate 60 and the metal reflective structure 26. The gap G may be defined as the gap G between the side 61 (adjacent to the edge 218 of the circuit board 21) of the support plate 60 and the edge 218 of the circuit board 21, for example. In some embodiments, in the first direction D1, the width WG of the gap G is less than the width of the via hole 264 of the metal reflective structure 26, but it is not limited thereto. The width WG of the gap G may be measured as the maximum width between the side 61 of the bottom plate 11 and the edge 218 of the circuit board 21 in the first direction D1 when the metal reflective structure 26 is unfolded. In some embodiments, in the first direction D1, the width WG of the gap G is less than the width WO of the opening O of the second dielectric layer 213, but it is not limited thereto. The width W264 and the width WO are defined as above.

Referring to FIG. 15, the metal reflective structure 26 includes a first portion 26A, a second portion 26B and/or a third portion 26C. The first portion 26A is defined as the portion that is disposed on the circuit board 21, the second portion 26B is defined as the portion that is disposed on the support plate 60, and the third portion 26C is defined as the portion that is not disposed on the support plate 60 and the circuit board 21 (i.e. the portion corresponding to the gap G), for example. In some embodiments, the third portion 26C may be connected to the first portion 26A and the second portion 26B, but it is not limited thereto. In some embodiments (referring to FIG. 17), the first portion 26A may be connected to the second portion 26B, that is, the third portion 26C is not present. In some embodiments, the first portion 26A of the metal reflective structure 26 may have a via hole 264 (as above-mentioned), and a portion of the circuit board 21 (such as a portion of the conductive layer 212 and/or a portion of the second dielectric layer 213) may be exposed from the via hole 264. In some embodiments, the first portion 26A that is adjacent to the edge 218 of the circuit board 21 may have a width H1 in the first direction D1, and the width H1 may be defined as the maximum width of the first portion 26A in the first direction D1. In other words, the width H1 may be substantially equal to the maximum distance between the via hole 264 and the edge 218 of the circuit board 21 in the first direction D1. In some embodiments, the width H1 may be in a range from 0 mm to 2 mm (0 mm≤the width H1≤2 mm), but it is not limited thereto. In some embodiments, the width H1 may be in a range from 0 mm to 1 mm (0 mm≤the width H1≤1 mm), but it is not limited thereto. If the width H1 is too large, the width of the side frame of the electronic device may be increased. Therefore, the above design for the width H1 may reduce the width of the side frame of the electronic device, or reduce the possibility of the peeling of the metal reflective structure 26 during bending. As such, the yield of the metal reflective structure 26 during the bending process may be increased. The aforementioned peeling may be the peeling between the metal reflective structure 26 (e.g. the portion that is adjacent to the support plate 60) and the circuit board 21, but it is not limited thereto.

Figure 16:
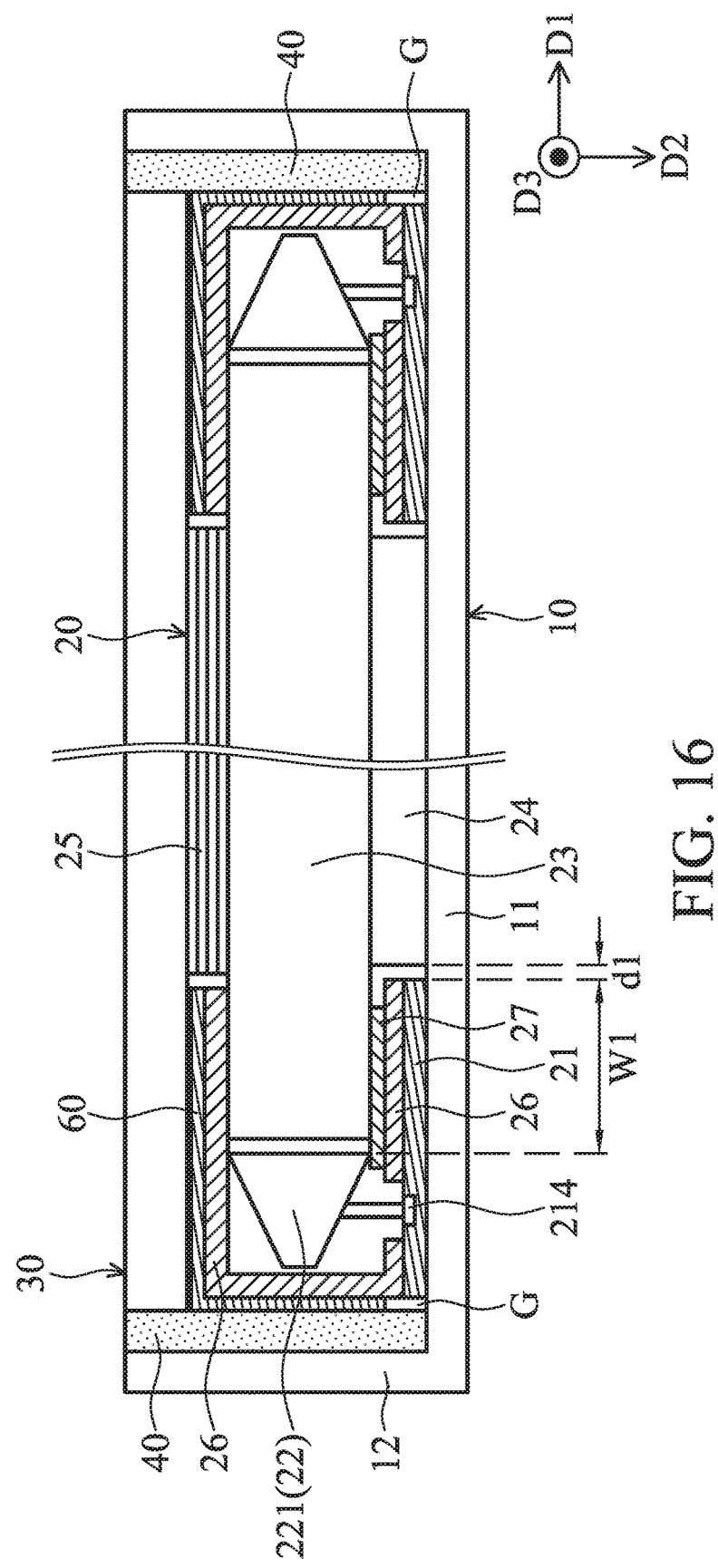
FIG. 16 is a cross-sectional view illustrating the electronic device in accordance with some other embodiments of the present disclosure.

Please refer to FIG. 16, which is a cross-sectional view illustrating the electronic device 1 in accordance with some other embodiments of the present disclosure. The electronic device 1 shown in FIG. 16 includes a similar structure as that of the electronic device 1 shown in above embodiments. However, the present embodiment includes the circuit board 21, the support plate 60 and the metal reflective structure 26. As shown in FIG. 16, the metal reflective structure 26 may be bent. In some embodiments, a portion of the metal reflective structure 26 is disposed corresponding to the thinner support plate 60, and therefore, the size (including the width or the thickness) of the electronic device 1 may be reduced, or the yield of the metal reflective structure 26 during the bending process may be increased.

Figure 17:
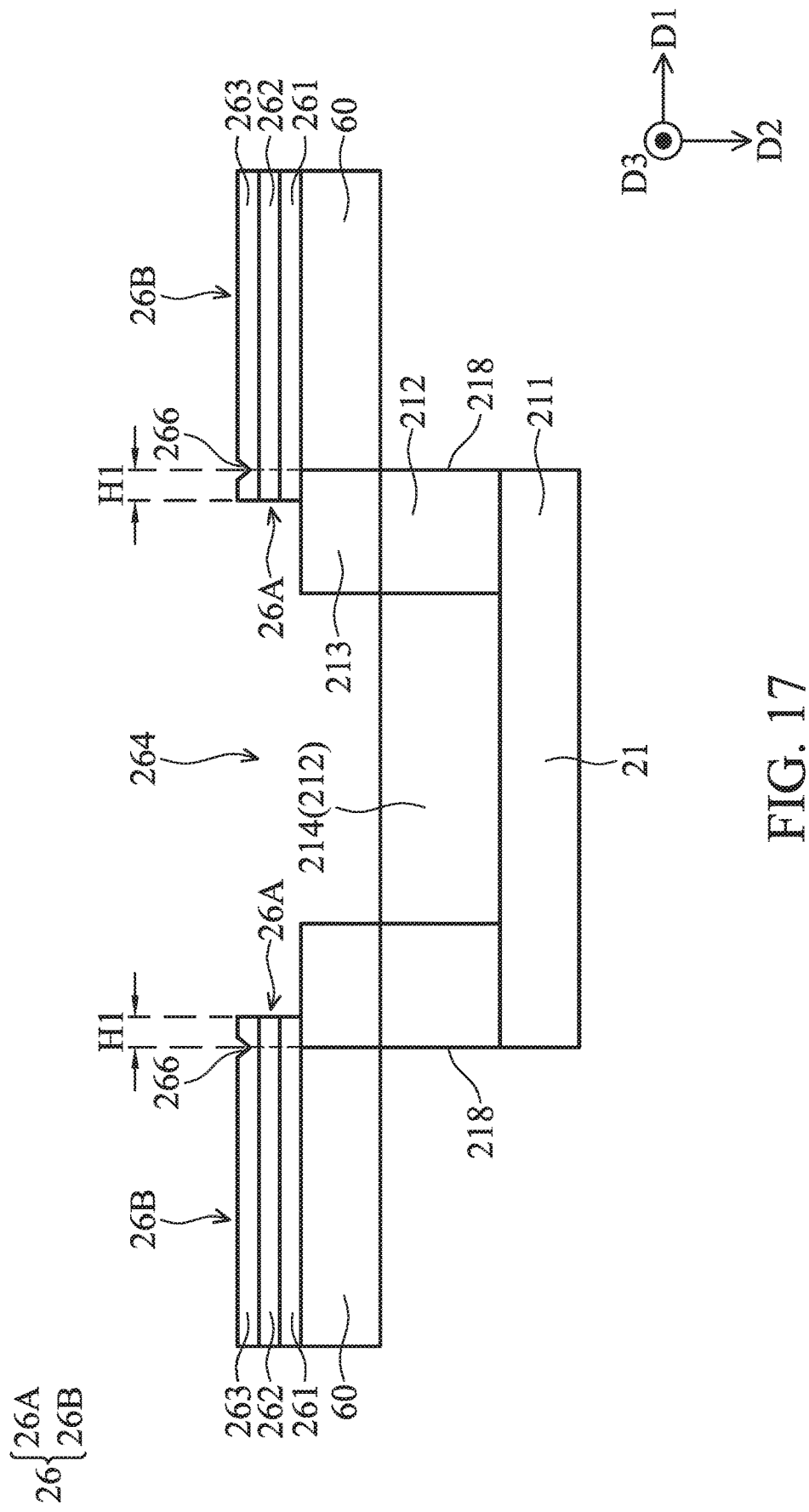
FIG. 17 is a cross-sectional view illustrating the circuit board, the support plate and the metal reflective structure in accordance with some other embodiments of the present disclosure.

Please refer to FIG. 17, which is a cross-sectional view illustrating the circuit board 21, the support plate 60 and the metal reflective structure 26 in accordance with some other embodiments of the present disclosure. It should be noted that the cross-sectional view shown in FIG. 17 illustrates, for example, that the metal reflective structure 26 remains unfold (i.e. planar). As shown in FIG. 17, the support plates 60 are each disposed on both sides of the circuit board 21. The metal reflective structure 26 may have multiple second portions 26B, and each of which are disposed on different support plates 60. In some embodiments, the first portions 26A on opposite sides of the via hole 264 are separated. In other embodiments, the first portions 26A on opposite sides of the via hole 264 are connected, but the present disclosure are not limited thereto. In some embodiments, a gap G may be optionally formed between the circuit board 21 and the support plate 60 or not, but it is not limited thereto. In some embodiments, in the first direction D1, the circuit board 21 may have two edges 218, which are adjacent to different support plates 60, respectively. The first portions 26A that are adjacent to the edges 218 may each have a width H1 in the first direction D1. The range of the value of the width H1 are provided as above, and will not be repeated in the following paragraphs. In some embodiments, the widths H1 of the first portions 26A located on opposite sides of the via hole 264 may be the same or different. In some embodiments (not shown), when the metal reflective structure 26 is bent, the position of the circuit board 21 may substantially correspond to the sidewall 12 (referring to FIG. 16) of the housing 10 or the frame 40 because of the above design. The support plates 60 are each disposed corresponding to the upper side and the lower side of the light guide plate 23, for example. In some embodiments, as a gap G is not formed between the circuit board 21 and the support plate 60, the circuit board 21 contacts the support plate 60, and the structural strength therebetween may be enhanced.

Referring to FIG. 17, in some embodiments, the metal reflective structure 26 may have a notch 266, which may be substantially adjacent to the connecting region between the first portion 26A and the second portion 26B, but it is not limited thereto. In some embodiments, the notch 266 may be substantially located at the connecting region between the first portion 26A and the second portion 26B. In other words, the notch 266 may substantially correspond to the junction between the circuit board 21 and the support plate 60, but it is not limited thereto. In some embodiments (not shown), the extending direction of the notch 266 is substantially parallel to the direction (or the third direction D3) of the junction between the circuit board 21 and the support plate 60, but it is not limited thereto. The extending direction of the notch 266 may be adjusted as required. The arrangement of the notch 266 may make the metal reflective structure 26 to be bent more easily. In some embodiments, the notch 266 does not penetrate the metal reflective structure 26, but it is not limited thereto. In some embodiments (not shown), a plurality of notches 266 may be formed on the metal reflective structure 26, and these notches 266 are arranged adjacent to the junction between the circuit board 21 and the support plate 60, but the present disclosure is not limited thereto. In some embodiments, the arranging direction of the notches 266 may be substantially parallel to the direction of the junction between the circuit board 21 and the support plate 60, but it is not limited thereto. The arranging direction of the notches 266 may be adjusted as required. In some embodiments (not shown), the notches 266 may be substantially overlap with the junction between the circuit board 21 and the support plate 60, but the present disclosure is not limited thereto. In some embodiments, the notches 266 may penetrate the metal reflective structure 26 and be separated from each other (which look like a stamp hole), but the present disclosure is not limited thereto.

These disclosed features may be combined, modified, replaced or switched with one or more disclosed embodiments in any suitable way, and are not limited in any particular embodiment. In addition, some embodiments in the present disclosure provide some advantages that are better than the prior art. However, it should be appreciated that other embodiments may also provide different advantages. All of these advantages are not necessary to be discussed in the present disclosure, and there is no particular advantage that needs to be present in all the embodiments. Multiple advantages may exist in some embodiments.

As set forth above, the electronic device in the present disclosure may reduce the consumption of the light emitted from the light source by the metal reflective structure, and the luminance of the electronic device may be enhanced. In addition, the assembly of the backlight module may be simplified by arranging the metal reflective structure on the circuit board.

While the embodiments and the advantages of the present disclosure have been described above, it should be understood that those skilled in the art may make various changes, substitutions, and alterations to the present disclosure without departing from the spirit and scope of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure, as long as substantially the same function or result may be obtained as that in the above embodiments based on the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. An electronic device, comprising:
a circuit board;
a support plate adjacent to the circuit board; and
a metal reflective structure disposed on the circuit board, wherein the metal reflective structure comprises a protective layer and a metal layer, the metal layer is located between the protective layer and the circuit board, and the protective layer includes transparent materials,
wherein the metal reflective structure comprises a first portion and a second portion, the first portion is disposed on the circuit board, the second portion is disposed on the support plate, and a thickness of the support plate is less than a thickness of the circuit board,
wherein a via hole is formed between the first portion and the second portion, and the circuit board is partially exposed from the via hole.

2. The electronic device as claimed in claim 1, wherein the metal reflective structure further comprises an adhesive layer disposed between the metal layer and the circuit board.

3. The electronic device as claimed in claim 1, wherein the material of the protective layer comprises polyimide, silicon mononitride, silicon dioxide or a combination thereof.

4. The electronic device as claimed in claim 1, wherein the thickness of the protective layer is in a range from 9 μm to 15 μm.

5. The electronic device as claimed in claim 1, wherein the metal layer comprises silver, and the thickness of the metal layer is in a range from 0.1 μm to 1 μm.

6. The electronic device as claimed in claim 1, comprising a light source electrically connected to the circuit board, wherein the circuit board has a bottom portion and a bent portion connected to the bottom portion, and the metal reflective structure is disposed corresponding to at least one of the bottom portion and the bent portion.

7. The electronic device as claimed in claim 6, wherein the circuit board comprises a top portion, the bent portion is connected to the bottom portion and the top portion, and the metal reflective structure is disposed corresponding to the top portion.

8. The electronic device as claimed in claim 6, wherein the circuit board comprises a top portion, the bent portion is connected to the bottom portion and the top portion, the top portion comprises a conductive pad, and the light source is electrically connected to the circuit board via the conductive pad.

9. The electronic device as claimed in claim 1, comprising:
a light source electrically connected to the circuit board;
a light guide plate disposed adjacent to the light source and the circuit board; and
a prism sheet disposed below the light guide plate.

10. The electronic device as claimed in claim 1, comprising a reverse prism sheet disposed on the light guide plate.

11. The electronic device as claimed in claim 1, wherein the circuit board comprises a side adjacent to the support plate, the first portion adjacent to the side has a width, and the width is between 0 mm to 2 mm.

12. The electronic device as claimed in claim 1, wherein the circuit board contacts the support plate.

13. The electronic device as claimed in claim 1, wherein a gap is formed between the circuit board and the support plate.

14. The electronic device as claimed in claim 1, wherein the metal reflective structure further comprises a third portion connected to the first portion and the second portion, and not disposed on the support plate and the circuit board.

15. The electronic device as claimed in claim 14, wherein the width of the first portion is not greater than 1 mm.

16. The electronic device as claimed in claim 1, wherein the metal reflective structure has at least one notch located at a connecting region between the first portion and the second portion.

17. The electronic device as claimed in claim 1, comprising a plurality of notches formed on and penetrating the metal reflective structure, wherein the plurality of notches are separated from each other.

18. The electronic device as claimed in claim 1, comprising two support plates, wherein the two support plates are each disposed on both sides of the circuit board, and the metal reflective structure comprises two second portions each disposed on the different support plates.

\* \* \* \* \*